US008745124B2

(12) United States Patent
Lindley et al.

(10) Patent No.: US 8,745,124 B2
(45) Date of Patent: Jun. 3, 2014

(54) EXTENSIBLE POWER CONTROL FOR AN AUTONOMICALLY CONTROLLED DISTRIBUTED COMPUTING SYSTEM

(75) Inventors: Craig A. Lindley, Colorado Springs, CO (US); James D. Engquist, Colorado Springs, CO (US)

(73) Assignee: CA, Inc., Islandia, NY (US)

( * ) Notice: Subject to any disclaimer, the term of this patent is extended or adjusted under 35 U.S.C. 154(b) by 1549 days.

(21) Appl. No.: 11/263,593

(22) Filed: Oct. 31, 2005

(65) Prior Publication Data
US 2007/0101167 A1    May 3, 2007

(51) Int. Cl.
G06F 15/16 (2006.01)
G06F 15/173 (2006.01)
G06F 1/00 (2006.01)

(52) U.S. Cl.
USPC .......................... 709/202; 709/223; 713/300

(58) Field of Classification Search
USPC .......... 709/202, 219, 220, 223; 713/300, 310, 713/320, 323
See application file for complete search history.

(56) References Cited

U.S. PATENT DOCUMENTS

| | | | |
|---|---|---|---|
| 5,892,946 A * | 4/1999 | Woster et al. .................. 719/316 |
| 6,167,316 A * | 12/2000 | Gloudeman et al. .............. 700/2 |
| 2003/0028679 A1* | 2/2003 | Babka et al. ................... 709/310 |
| 2003/0065853 A1* | 4/2003 | Lary et al. ...................... 710/260 |
| 2003/0105838 A1* | 6/2003 | Presley .......................... 709/220 |
| 2003/0120780 A1* | 6/2003 | Zhu et al. ...................... 709/226 |
| 2004/0088716 A1* | 5/2004 | Solter et al. ................... 719/318 |
| 2004/0143826 A1* | 7/2004 | Gissel et al. ................... 717/162 |
| 2004/0158549 A1* | 8/2004 | Matena et al. .................... 707/1 |
| 2004/0194066 A1* | 9/2004 | Frey et al. ..................... 717/127 |
| 2005/0143850 A1* | 6/2005 | Pavlik et al. ..................... 700/83 |
| 2005/0216510 A1* | 9/2005 | Kautzleben et al. ......... 707/104.1 |
| 2005/0256939 A1* | 11/2005 | Naismith et al. .............. 709/219 |
| 2005/0273668 A1* | 12/2005 | Manning .......................... 714/39 |
| 2006/0067209 A1* | 3/2006 | Sheehan et al. ............... 370/216 |
| 2007/0011618 A1* | 1/2007 | Maron .......................... 715/749 |

OTHER PUBLICATIONS

J. M. Nogiec, E. Desavouret, "Distributed Power Supply Control and Monitoring System", 8th International Conference on Accelerator & Large Experimental Physics Control System, 2001, San Jose, California, THAPO72 physics/0111026, pp. 611-613.*
Forgy, Charles L., "RETE: A Fast Algorithm for the Many Pattern/Many Object Pattern Match Problem", Artificial Intelligence, 1982, (pp. 17-37).
Miranker et al., "On the Performance of Lazy Matching in Production Systems", Knowledge Representation, 1990, (pp. 685-692).

* cited by examiner

*Primary Examiner* — Viet Vu
*Assistant Examiner* — Herman Belcher
(74) *Attorney, Agent, or Firm* — Baker Botts, LLP

(57) ABSTRACT

The invention is directed to techniques of extensible power control for an autonomically controlled distributed computing system. In particular, control nodes of the distributed computing system utilize software power control modules to communicate with hardware power controllers within the distributed computing system. The power control modules are discrete software units that may be easily deployed and un-deployed while software on the control node is executing. Further, each power control module corresponds to one or more firmware versions of one or more types of hardware power controller. The power control modules are each implementations of a software interface common to every power control module. Because the power control modules share a common interface, the software on the control node that autonomically controls the distributed computing environment does not need to consider differences among types of hardware power controllers and versions of firmware installed on the hardware power controllers.

35 Claims, 24 Drawing Sheets

EXTENSIBLE POWER CONTROL FOR AN AUTONOMICALLY CONTROLLED DISTRIBUTED COMPUTING SYSTEM

TECHNICAL FIELD

The invention relates to computing environments, and, more particularly, to distributed computing environments.

BACKGROUND

Distributed computing systems are increasingly being utilized to support business as well as technical applications. Typically, distributed computing systems are constructed from a collection of computing nodes that combine to provide a set of processing services to implement distributed computing applications. Each of the computing nodes in the distributed computing system is typically a separate, independent computing device interconnected with each of the other computing nodes via a communications medium, e.g., a network.

One challenge with distributed computing systems is the programmatic control of power to the computing nodes. With programmatic power control, a control node of the distributed computing system can, for example, power-up, power-down, and power cycle computing nodes without an administrator having to physically interact with the controlled computing nodes. An administrator of the distributed computing environment may need programmatic power control functions for a variety of purposes. For instance, the administrator may want the distributed computing system to power-down a computing node in which an application has become non-responsive.

Differing specifications and communications protocols complicate the task of programmatic power control. A distributed computing system may be composed of computing nodes manufactured by various vendors. Vendors equip some of the computing nodes with special power control hardware units. The power control hardware units facilitate remote power control over the managed nodes. However, power control hardware units supplied by one vendor are frequently incompatible with power control hardware units supplied by a second vendor. This is because each vendor may use a different protocol to facilitate communication with power control hardware unit or a different instruction set within the power control hardware unit. For instance, the power control hardware units manufactured by a first vendor may use secure shell ("SSH") commands to communicate with a control node while a second vendor may use telnet.

SUMMARY

In general, the invention is directed to a distributed computing system that conforms to a multi-level, hierarchical organizational model. One or more control nodes provide for the efficient and automated allocation and management of computing functions and resources within the distributed computing system in accordance with the organization model. Programmatic power control is one aspect of managing computing resources in the distributed computing system. As described herein, the control nodes may implement programmatic power control using a set of easily deployed and un-deployed power control modules.

For example, in one aspect of the invention, the power control modules are contained in power control files. Specifically, each power control file contains an executable registration portion and a power control module. The registration portion registers the power control module when an administrator of the distributed computing system deploys the power control module. Further, the registration portion un-registers the power control module when then administrator un-deploys the power control module. The power control module implements a software object interface that is common to all power control modules. After the control nodes register the power control module, the control nodes may use the power control module to perform power control applications on hardware power controllers in the distributed computing system.

In one embodiment, the invention is directed to a distributed computing system that comprises a plurality of application nodes coupled to a communication network. The distributed computing system also includes a plurality of hardware power controllers coupled to the communications network and a control node providing an operating environment for a plurality of power control modules that instruct the hardware power controllers to perform power control applications on the application nodes. The control node automatically registers a new power control module without requiring interrupting execution of the control node.

In another embodiment, the invention is directed to a method that comprises automatically registering a new power control module with a control node of an autonomic distributed computing system without interrupting execution of the control node. In addition, the method comprises using, with the control node, the power control module to autonomically cause a hardware power controller to perform a power control application.

In another embodiment, the invention is directed to a method comprising initiating execution of a control node that autonomically controls a distributed computing system that includes a hardware power controller. In addition, the method comprises deploying a power control module after initiating execution of the control node, wherein the control node subsequently uses the power control module to cause the hardware power controller to perform a power control application.

In another embodiment, the invention is directed to a computer-readable medium comprising instructions. The instructions cause a programmable processor to execute a registration portion of a new power control module with a control node without interrupting execution of the control node. The instructions also cause the processor to invoke, with the control node, the power control module to autonomically cause a hardware power controller to perform a power control application.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 9 is a screen illustration of an exemplary user interface for viewing and identify properties of a computing node.

FIG. 11 is a screen illustration of an exemplary user interface for viewing a hardware inventory report.

DETAILED DESCRIPTION

Figure 1:
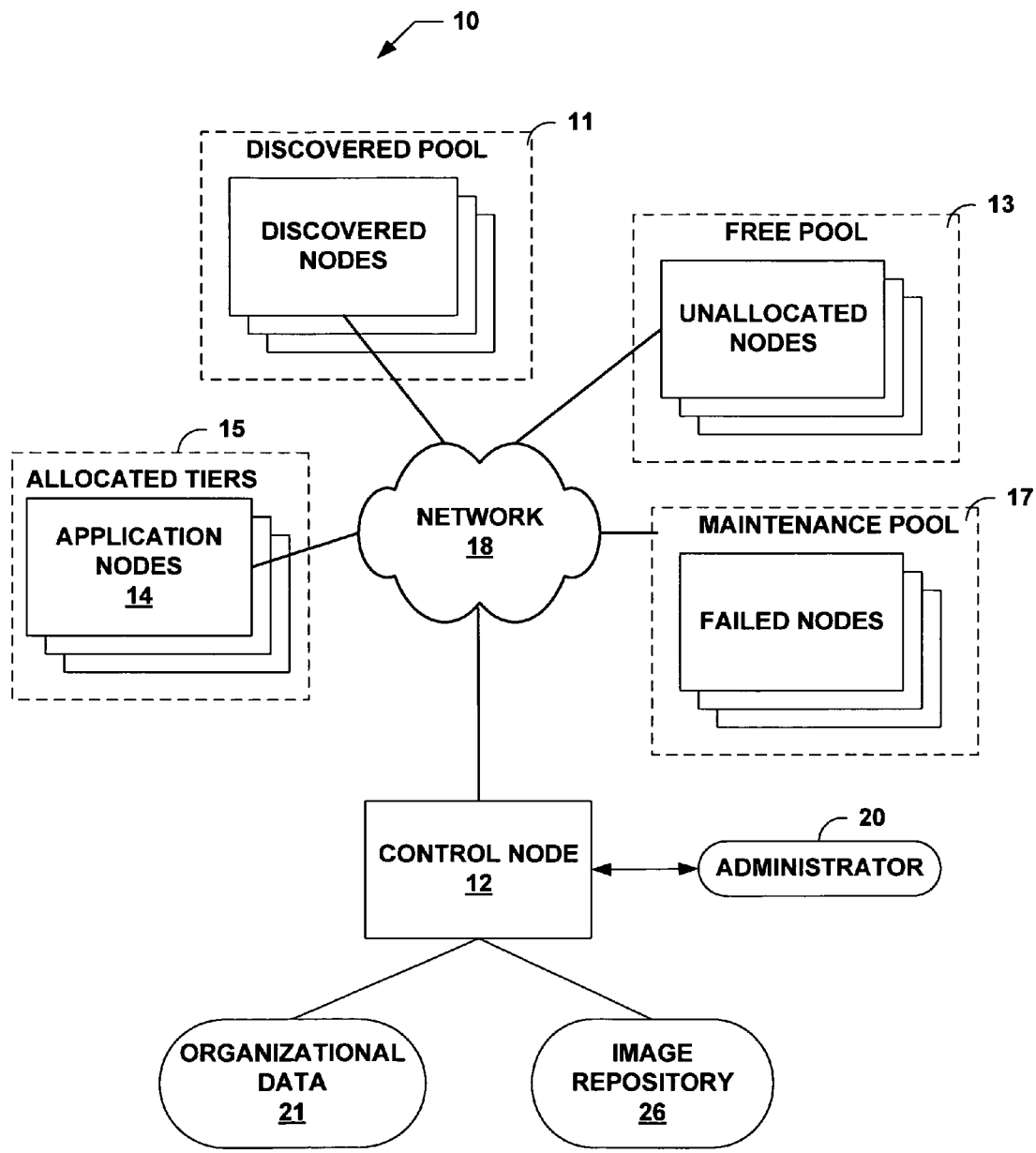
FIG. 1 is a block diagram illustrating a distributed computing system constructed from a collection of computing nodes.

FIG. 1 is a block diagram illustrating a distributed computing system 10 constructed from a collection of computing nodes. Distributed computing system 10 may be viewed as a collection of computing nodes operating in cooperation with each other to provide distributed processing.

In the illustrated example, the collection of computing nodes forming distributed computing system 10 are logically grouped within a discovered pool 11, a free pool 13, an allocated tiers 15 and a maintenance pool 17. In addition, distributed computing system 10 includes at least one control node 12.

Within distributed computing system 10, a computing node refers to the physical computing device. The number of computing nodes needed within distributed computing system 10 is dependent on the processing requirements. For example, distributed computing system 10 may include 8 to 512 computing nodes or more. Each computing node includes one or more programmable processors for executing software instructions stored on one or more computer-readable media.

Discovered pool 11 includes a set of discovered nodes that have been automatically "discovered" within distributed computing system 10 by control node 12. For example, control node 12 may monitor dynamic host communication protocol (DHCP) leases to discover the connection of a node to network 18. Once detected, control node 12 automatically inventories the attributes for the discovered node and reassigns the discovered node to free pool 13. The node attributes identified during the inventory process may include a CPU count, a CPU speed, an amount of memory (e.g., RAM), local disk characteristics or other computing resources. Control node 12 may also receive input identifying node attributes not detectable via the automatic inventory, such as whether the node includes I/O, such as HBA. Further details with respect to the automated discovery and inventory processes are described in U.S. patent application Ser. No. 11/070,851, entitled "AUTOMATED DISCOVERY AND INVENTORY OF NODES WITHIN AN AUTONOMIC DISTRIBUTED COMPUTING SYSTEM," filed Mar. 2, 2005, the entire content of which is hereby incorporated by reference.

Free pool 13 includes a set of unallocated nodes that are available for use within distributed computing system 10. Control node 12 may dynamically reallocate an unallocated node from free pool 13 to allocated tiers 15 as an application node 14. For example, control node 12 may use unallocated nodes from free pool 13 to replace a failed application node 14 or to add an application node to allocated tiers 15 to increase processing capacity of distributed computing system 10.

In general, allocated tiers 15 include one or more tiers of application nodes 14 that are currently providing a computing environment for execution of user software applications. In addition, although not illustrated separately, application nodes 14 may include one or more input/output (I/O) nodes. Application nodes 14 typically have more substantial I/O capabilities than control node 12, and are typically configured with more computing resources (e.g., processors and memory). Maintenance pool 17 includes a set of nodes that either could not be inventoried or that failed and have been taken out of service from allocated tiers 15.

Control node 12 provides the system support functions for managing distributed computing system 10. More specifically, control node 12 manages the roles of each computing node within distributed computing system 10 and the execution of software applications within the distributed computing system. In general, distributed computing system 10 includes at least one control node 12, but may utilize additional control nodes to assist with the management functions.

Other control nodes 12 (not shown in FIG. 1) are optional and may be associated with a different subset of the computing nodes within distributed computing system 10. Moreover, control node 12 may be replicated to provide primary and backup administration functions, thereby allowing for graceful handling a failover in the event control node 12 fails.

Network 18 provides a communications interconnect for control node 12 and application nodes 14, as well as discovered nodes, unallocated nodes and failed nodes. Communications network 18 permits internode communications among the computing nodes as the nodes perform interrelated operations and functions. Communications network 18 may comprise, for example, direct connections between one or more of the computing nodes, one or more customer networks maintained by an enterprise, local area networks (LANs), wide area networks (WANs) or a combination thereof. Communications network 18 may include a number of switches, routers, firewalls, load balancers, and the like.

In one embodiment, each of the computing nodes within distributed computing system 10 executes a common general-purpose operating system. One example of a general-purpose operating system is the Windows™ operating system provided by Microsoft Corporation. In some embodiments, the general-purpose operating system such as the Linux kernel may be used.

In the example of FIG. 1, control node 12 is responsible for software image management. The term "software image" refers to a complete set of software loaded on an individual computing node, including the operating system and all boot code, middleware and application files. System administrator 20 may interact with control node 12 and identify the particular types of software images to be associated with application nodes 14. Alternatively, administration software executing on control node 12 may automatically identify the appropriate software images to be deployed to application nodes 14 based on the input received from system administrator 20. For example, control node 12 may determine the type of software image to load onto an application node 14 based on the functions assigned to the node by system administrator 20. Application nodes 14 may be divided into a number of groups based on their assigned functionality. As one example, application nodes 14 may be divided into a first group to provide web server functions, a second group to provide business application functions and a third group to provide database functions. The application nodes 14 of each group may be associated with different software images.

Control node 12 provides for the efficient allocation and management of the various software images within distributed computing system 10. In some embodiments, control node 12 generates a "golden image" for each type of software image that may be deployed on one or more of application nodes 14. As described herein, the term "golden image" refers to a reference copy of a complete software stack.

System administrator 20 may create a golden image by installing an operating system, middleware and software applications on a computing node and then making a complete copy of the installed software. In this manner, a golden image may be viewed as a "master copy" of the software image for a particular computing function. Control node 12 maintains a software image repository 26 that stores the golden images associated with distributed computing system 10.

Control node 12 may create a copy of a golden image, referred to as an "image instance," for each possible image instance that may be deployed within distributed computing system 10 for a similar computing function. In other words, control node 12 pre-generates a set of K image instances for a golden image, where K represents the maximum number of image instances for which distributed computing system 10 is configured for the particular type of computing function. For a given computing function, control node 12 may create the complete set of image instance even if not all of the image instances will be initially deployed. Control node 12 creates different sets of image instances for different computing functions, and each set may have a different number of image instances depending on the maximum number of image instances that may be deployed for each set. Control node 12 stores the image instances within software image repository 26. Each image instance represents a collection of bits that may be deployed on an application node.

Further details of software image management are described in co-pending U.S. patent application Ser. No. 11/046,133, entitled "MANAGEMENT OF SOFTWARE IMAGES FOR COMPUTING NODES OF A DISTRIBUTED COMPUTING SYSTEM," filed Jan. 28, 2005 and co-pending U.S. patent application Ser. No. 11/046,152, entitled "UPDATING SOFTWARE IMAGES ASSOCIATED WITH A DISTRIBUTED COMPUTING SYSTEM," filed Jan. 28, 2005, each of which is incorporated herein by reference in its entirety.

In general, distributed computing system 10 conforms to a multi-level, hierarchical organizational model that includes four distinct levels: fabric, domains, tiers and nodes. Control node 12 is responsible for all levels of management, including fabric management, domain creation, tier creation and node allocation and deployment.

As used herein, the "fabric" level generally refers to the logical constructs that allow for definition, deployment, partitioning and management of distinct enterprise applications. In other words, fabric refers to the integrated set of hardware, system software and application software that can be "knitted" together to form a complete enterprise system. In general, the fabric level consists of two elements: fabric components or fabric payload. Control node 12 provides fabric management and fabric services as described herein.

In contrast, a "domain" is a logical abstraction for containment and management within the fabric. The domain provides a logical unit of fabric allocation that enables the fabric to be partitioned amongst multiple uses, e.g. different business services.

Domains are comprised of tiers, such as a 4-tier application model (web server, application server, business logic, persistence layer) or a single tier monolithic application. Fabric domains contain the free pool of devices available for assignment to tiers.

A tier is a logically associated group of fabric components within a domain that share a set of attributes: usage, availability model or business service mission. Tiers are used to define structure within a domain e.g. N-tier application, and each tier represents a different computing function. A user, such as administrator 20, typically defines the tier structure within a domain. The hierarchical architecture may provide a high degree of flexibility in mapping customer applications to logical models which run within the fabric environment. The tier is one construct in this modeling process and is the logical container of application resources.

The lowest level, the node level, includes the physical components of the fabric. This includes computing nodes that, as described above, provide operating environments for system applications and enterprise software applications. In addition, the node level may include network devices (e.g., Ethernet switches, load balancers and firewalls) used in creating the infrastructure of network 18. The node level may further include network storage nodes that are network connected to the fabric.

System administrator 20 accesses administration software executing on control node 12 to logically define the hierarchical organization of distributed computing system 10. For example, system administrator 20 may provide organizational data 21 to develop a model for the enterprise and logically define the enterprise fabric. System administrator 20 may, for instance, develop a model for the enterprise that includes a number of domains, tiers, and node slots hierarchically arranged within a single enterprise fabric.

More specifically, system administrator 20 defines one or more domains that each correspond to a single enterprise application or service, such as a customer relation management (CRM) service. System administrator 20 further defines one or more tiers within each domain that represent the functional subcomponents of applications and services provided by the domain. As an example, system administrator 20 may define a storefront domain within the enterprise fabric that includes a web tier, an application tier and a database tier. In this manner, distributed computing system 10 may be configured to automatically provide web server functions, business application functions and database functions.

For each of the tiers, control node 12 creates a number of "node slots" equal to the maximum number of application nodes 14 that may be deployed. In general, each node slot represents a data set that describes specific information for a corresponding node, such as software resources for a physical node that is assigned to the node slot. The node slots may, for instance, identify a particular software image instance associated with an application node 14 as well as a network address associated with that particular image instance.

In this manner, each of the tiers include one or more node slots that reference particular software image instances to boot on the application nodes 14 to which each software image instance is assigned. The application nodes 14 to which control node 12A assigns the image instances temporarily inherit the network address assigned to the image instance for as long as the image instance is deployed on that particular application node. If for some reason the image instance is moved to a different application node 14, control node 12A moves the network address to that new application node.

System administrator 20 may further define specific node requirements for each tier of the fabric. For example, the node requirements specified by system administrator 20 may include a central processing unit (CPU) count, a CPU speed, an amount of memory (e.g., RAM), local disk characteristics and other hardware characteristics that may be detected on the individual computing nodes. System administrator 20 may also specify user-defined hardware attributes of the computing nodes, such as whether I/O (like HBA) is required. The user-defined hardware attributes are typically not capable of detection during an automatic inventory. In this manner, system administrator 20 creates a list of attributes that the tier requires of its candidate computing nodes. In addition, particular node requirements may be defined for software image instances.

In addition to the node requirements described above, system administrator 20 may further define policies that are used when re-provisioning computing nodes within the fabric. System administrator 20 may define policies regarding tier characteristics, such as a minimum number of nodes a tier requires, an indication of whether or not a failed node is dynamically replaced by a node from free pool 13, a priority for each tier relative to other tiers, an indication of whether or not a tier allows nodes to be re-provisioned to other tiers to satisfy processing requirements by other tiers of a higher priority or other policies. Control node 12 uses the policy information input by system administrator 20 to re-provision computing nodes to meet tier processing capacity demands.

After receiving input from system administrator 20 defining the architecture and policy of the enterprise fabric, control node 12 identifies unallocated nodes within free pool 13 that satisfy required node attributes. Control node 12 automatically assigns unallocated nodes from free pool 13 to respective tier node slots of a tier. As will be described in detail herein, in one embodiment, control node 12 may assign computing nodes to the tiers in a "best fit" fashion. Particularly, control node 12 assigns computing nodes to the tier whose node attributes most closely match the node requirements of the tier as defined by administrator 20. The assignment of the computing nodes may occur on a tier-by-tier basis beginning with a tier with the highest priority and ending with a tier with the lowest priority. Alternatively, or in addition, assignment of computing nodes may be based on dependencies defined between tiers.

As will be described in detail below, control node 12 may automatically add unallocated nodes from free pool 13 to a tier when more processing capacity is needed within the tier, remove nodes from a tier to the free pool when the tier has excess capacity, transfer nodes from tier to tier to meet processing demands, or replace failed nodes with nodes from the free pool. Thus, computing resources, i.e., computing nodes, may be automatically shared between tiers and domains within the fabric based on user-defined policies to dynamically address high-processing demands, failures and other events.

Figure 2:
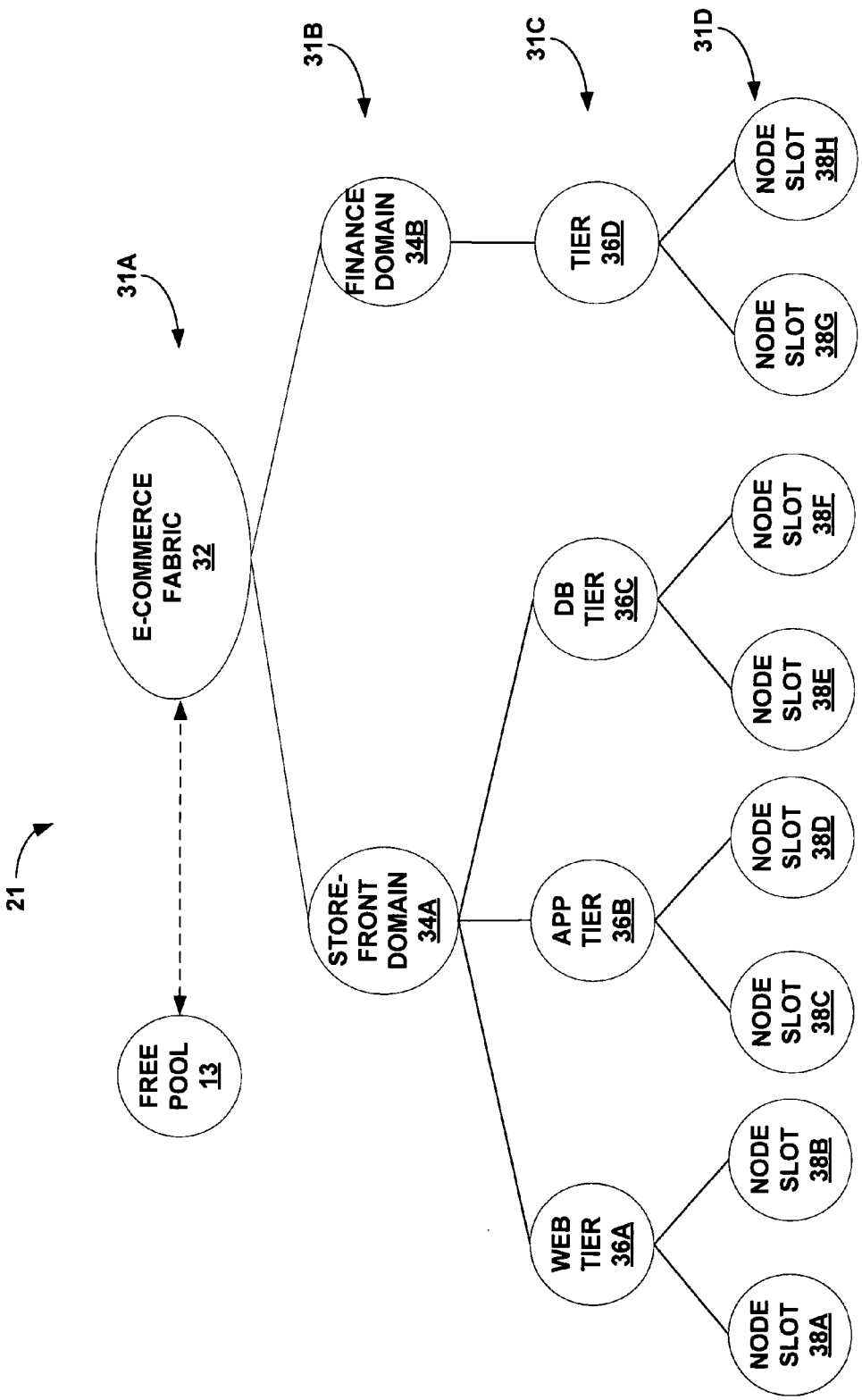
FIG. 2 is a schematic diagram illustrating an example of a model of an enterprise that logically defines an enterprise fabric.

FIG. 2 is a schematic diagram illustrating an example embodiment of organizational data 21 that defines a model logically representing an enterprise fabric in accordance with the invention. In the example illustrated in FIG. 2, control node 12 (FIG. 1) maintains organizational data 21 to define a simple e-commerce fabric 32.

In this example, e-commerce fabric 32 includes a storefront domain 34A and a financial planning domain 34B. Storefront domain 34A corresponds to the enterprise storefront domain and allows customers to find and purchase products over a network, such as the Internet. Financial planning domain 34B allows one or more employees to perform financial planning tasks for the enterprise.

Tier level 31C includes one or more tiers within each domain that represent the functional subcomponents of applications and services provided by the domain. For example, storefront domain 34A includes a web server tier (labeled "web tier") 36A, a business application tier (labeled "app tier") 36B, and a database tier (labeled "DB tier") 36C. Web server tier 36A, business application tier 36B and database tier 36C interact with one another to present a customer with an online storefront application and services. For example, the customer may interact with web server tier 36A via a web browser. When the customer searches for a product, web server tier 36A may interacts with business application tier 36B, which may in turn access a database tier 36C. Similarly, financial planning domain 34B includes a financial planning tier 36D that provides subcomponents of applications and services of the financial planning domain 34B. Thus, in this example, a domain may include a single tier.

Tier level 31D includes one or more logical node slots 38A-38H ("node slots 38") within each of the tiers. Each of node slots 38 include node specific information, such as software resources for an application node 14 that is assigned to a respective one of the node slots 38. Node slots 38 may, for instance, identify particular software image instances within image repository 26 and map the identified software image instances to respective application nodes 14. As an example, node slots 38A and 38B belonging to web server tier 36A may reference particular software image instances used to boot two application nodes 14 to provide web server functions. Similarly, the other node slots 38 may reference software image instances to provide business application functions, database functions, or financial application functions depending upon the tier to which the node slots are logically associated.

Although in the example of FIG. 2, there are two node slots 38 corresponding to each tier, the tiers may include any number of node slots depending on the processing capacity needed on the tier. Furthermore, not all of node slots 38 may be currently assigned to an application node 14. For example, node slot 28B may be associated with an inactive software image instance and, when needed, may be assigned to an application node 14 for deployment of the software image instance.

In this example, organizational data 21 associates free node pool 13 with the highest-level of the model, i.e., e-commerce fabric 32. As described above, control node 12 may automatically assign unallocated nodes from free node pool 13 to at least a portion of tier node slots 38 of tiers 36 as needed using the "best fit" algorithm described above or another algorithm. Additionally, control node 12 may also add nodes from free pool 13 to a tier when more processing capacity is needed within the tier, remove nodes from a tier to free pool 13 when a tier has excess capacity, transfer nodes from tier to tier to meet processing demands, and replace failed nodes with nodes from the free tier.

Although not illustrated, the model for the enterprise fabric may include multiple free node pools. For example, the model may associate free node pools with individual domains at the domain level or with individual tier levels. In this manner, administrator 20 may define policies for the model such that unallocated computing nodes of free node pools associated with domains or tiers may only be used within the domain or tier to which they are assigned. In this manner, a portion of the computing nodes may be shared between domains of the entire fabric while other computing nodes may be restricted to particular domains or tiers.

Figure 3:
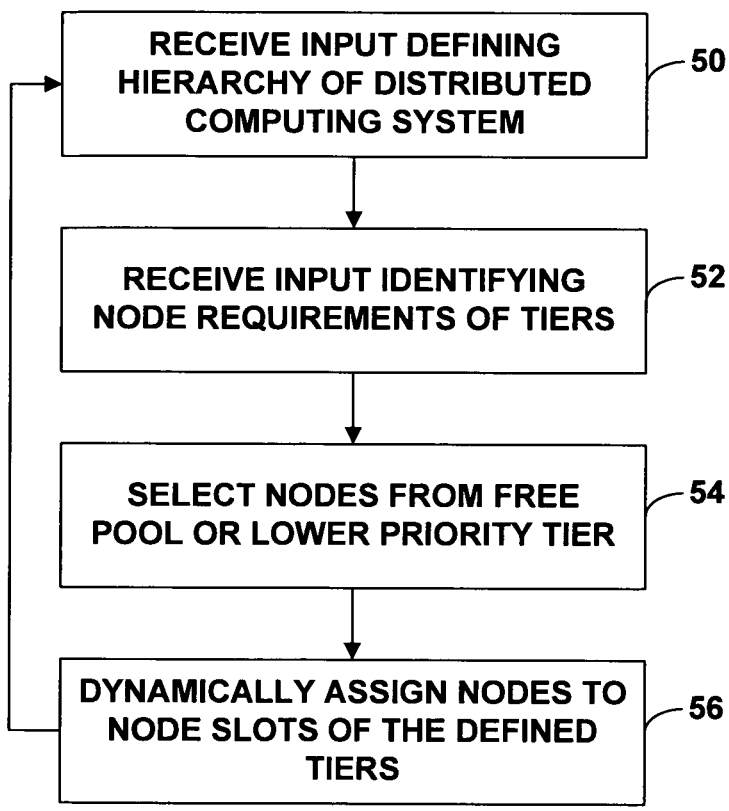
FIG. 3 is a flow diagram that provides a high-level overview of the operation of a control node when configuring the distributed computing system.

FIG. 3 is a flow diagram that provides a high-level overview of the operation of control node 12 when configuring distributed computing system 10. Initially, control node 12 receives input from a system administrator defining the hierarchical organization of distributed computing system 10 (50). In one example, control node 12 receives input that defines a model that specifies a number of hierarchically arranged nodes as described in detail in FIG. 2. Particularly, the defined architecture of distributed computing system 10 includes an overall fabric having a number of hierarchically arranged domains, tiers and node slots.

During this process, control node 12 may receive input specifying node requirements of each of the tiers of the hierarchical model (52). As described above, administrator 20 may specify a list of attributes, e.g., a central processing unit (CPU) count, a CPU speed, an amount of memory (e.g., RAM), or local disk characteristics, that the tiers require of their candidate computing nodes. In addition, control node 12 may further receive user-defined custom attributes, such as requiring the node to have I/O, such as HBA connectivity. The node requirements or attributes defined by system administrator 20 may each include a name used to identify the characteristic, a data type (e.g., integer, long, float or string), and a weight to define the importance of the requirement.

Control node 12 identifies the attributes for all candidate computing nodes within free pool 13 or a lower priority tier (54). As described above, control node 12 may have already discovered the computing nodes and inventoried the candidate computing nodes to identify hardware characteristics of all candidate computing nodes. Additionally, control node 12 may receive input from system administrator 20 identifying specialized capabilities of one or more computing nodes that are not detectable by the inventory process.

Control node 12 dynamically assigns computing nodes to the node slots of each tier based on the node requirements specified for the tiers and the identified node attributes (56). Population of the node slots of the tier may be performed on a tier-by-tier basis beginning with the tier with the highest priority, i.e., the tier with the highest weight assigned to it. As will be described in detail, in one embodiment, control node 12 may populate the node slots of the tiers with the computing nodes that have attributes that most closely match the node requirements of the particular tiers. Thus, the computing nodes may be assigned using a "best fit" algorithm.

Figure 4:
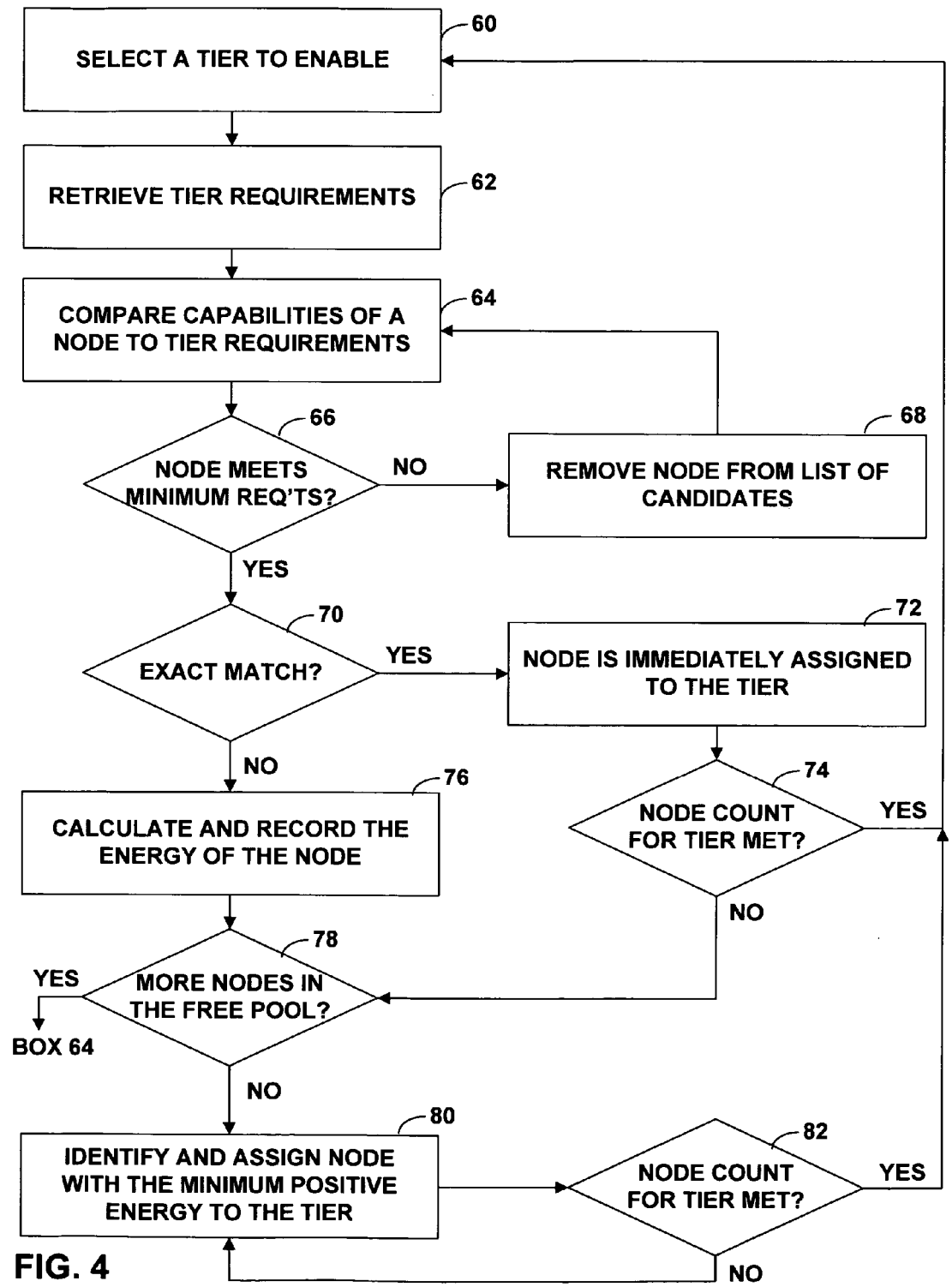
FIG. 4 is a flow diagram illustrating exemplary operation of the control node when assigning computing nodes to node slots of tiers.

FIG. 4 is a flow diagram illustrating exemplary operation of control node 12 when assigning computing nodes to node slots of tiers. Initially, control node 12 selects a tier to enable (60). As described above, control node 12 may select the tier based on a weight or priority assigned to the tier by administrator 20. Control node 12 may, for example, initially select the tier with the highest priority and successively enable the tiers based on priority.

Next, control node 12 retrieves the node requirements associated with the selected tier (62). Control node 12 may, for example, maintain a database having entries for each node slot, where the entries identify the node requirements for each of the tiers. Control node 12 retrieves the node requirements for the selected tier from the database.

In addition, control node 12 accesses the database and retrieves the computing node attributes of one of the unallocated computing nodes of free pool 13. Control node 12 compares the node requirements of the tier to the node attributes of the selected computing node (64).

Based on the comparison, control node 12 determines whether the node attributes of the computing node meets the minimum node requirements of the tier (66). If the node attributes of the selected computing node do not meet the minimum node requirements of the tier, then the computing node is removed from the list of candidate nodes for this particular tier (68). Control node 12 repeats the process by retrieving the node attributes of another of the computing nodes of the free pool and compares the node requirements of the tier to the node attributes of the computing node.

If the node attributes of the selected computing node meet the minimum node requirements of the tier (YES of 66), control node 12 determines whether the node attributes are an exact match to the node requirements of the tier (70). If the node attributes of the selected computing node and the node requirements of the tier are a perfect match (YES of 70), the computing node is immediately assigned from the free pool to a node slot of the tier and the image instance for the slot is associated with the computing node for deployment (72).

Control node 12 then determines whether the node count for the tier is met (74). Control node 12 may, for example, determine whether the tier is assigned the minimum number of nodes necessary to provide adequate processing capabilities. In another example, control node 12 may determine whether the tier is assigned the ideal number of nodes defined by system administrator 20. When the node count for the tier is met, control node 12 selects the next tier to enable, e.g., the tier with the next largest priority, and repeats the process until all defined tiers are enabled, i.e., populated with application nodes (60).

If the node attributes of the selected computing node and the node requirements of the tier are not a perfect match control node 12 calculates and records a "processing energy" of the node (76). As used herein, the term "processing energy" refers to a numerical representation of the difference between the node attributes of a selected node and the node requirements of the tier. A positive processing energy indicates the node attributes more than satisfy the node requirements of the tier. The magnitude of the processing energy represents the degree to which the node requirements exceed the tier requirements.

After computing and recording the processing energy of the nodes, control node 12 determines whether there are more candidate nodes in free pool 13 (78). If there are additional candidate nodes, control node 12 repeats the process by retrieving the computing node attributes of another one of the computing nodes of the free pool of computing nodes and comparing the node requirements of the tier to the node attributes of the computing node (64).

When all of the candidate computing nodes in the free pool have been examined, control node 12 selects the candidate computing node having the minimum positive processing energy and assigns the selected computing node to a node slot of the tier (80). Control node 12 determines whether the minimum node count for the tier is met (82). If the minimum node count for the tier has not been met, control node 12 assigns the computing node with the next lowest calculated processing energy to the tier (80). Control node 12 repeats this process until the node count is met. At this point, control node 12 selects the next tier to enable, e.g., the tier with the next largest priority (60).

In the event there are an insufficient number of computing nodes in free pool 13, or an insufficient number of computing nodes that meet the tier requirements, control node 12 notifies system administrator 20. System administrator 20 may add more nodes to free pool 13, add more capable nodes to the free pool, reduce the node requirements of the tier so more of the unallocated nodes meet the requirements, or reduce the configured minimum node counts for the tiers.

Figure 5:
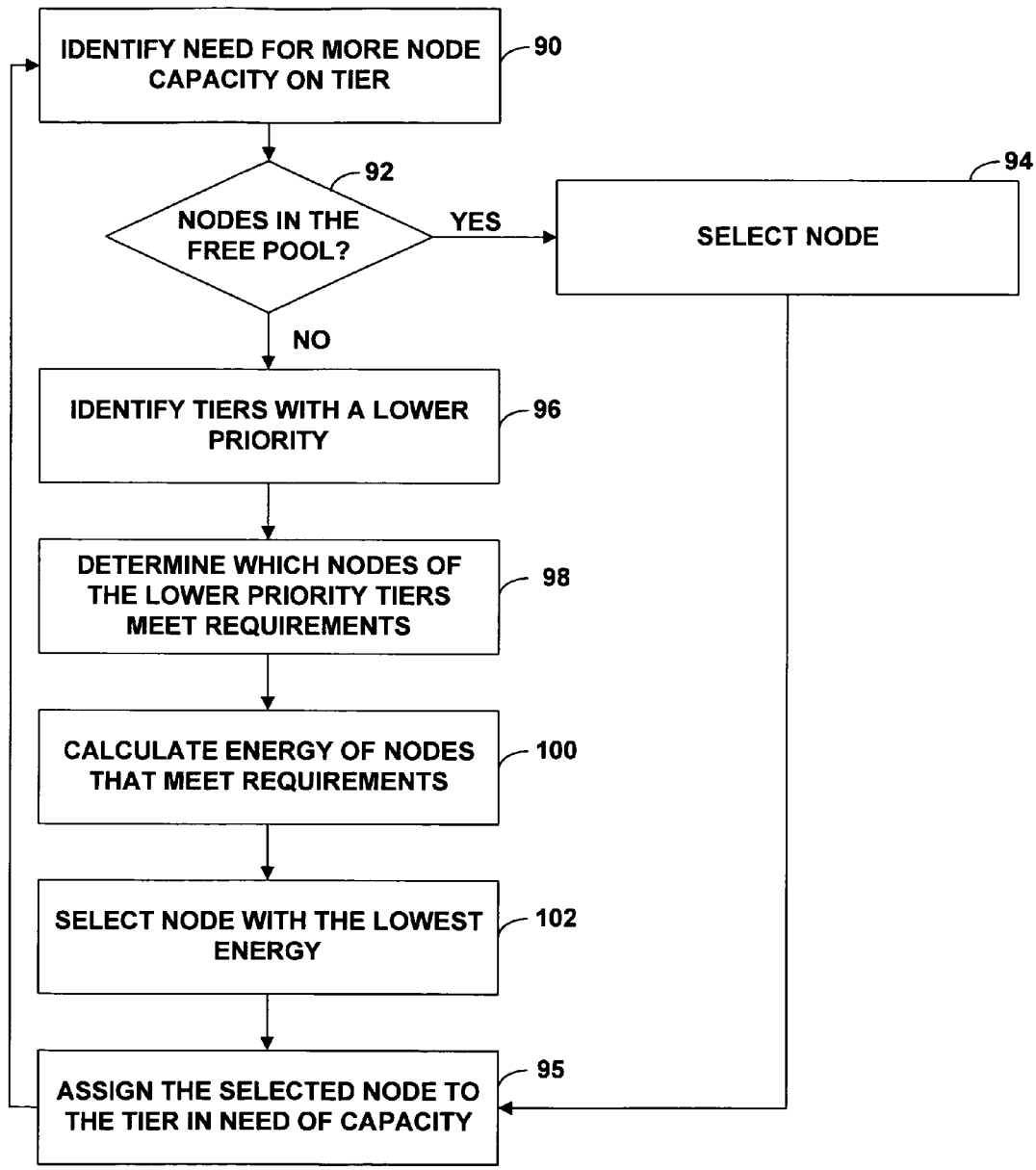
FIG. 5 is a flow diagram illustrating exemplary operation of a control node when adding an additional computing node to a tier to meet additional processing demands.

FIG. 5 is a flow diagram illustrating exemplary operation of control node 12 when adding an additional computing node to a tier to meet increased processing demands. Initially, control node 12 or system administrator 20 identifies a need for additional processing capacity on one of the tiers (90). Control node 12 may, for example, identify a high processing load on the tier or receive input from a system administrator identifying the need for additional processing capacity on the tier.

Control node 12 then determines whether there are any computing nodes in the free pool of nodes that meet the minimum node requirements of the tier (92). When there are one or more nodes that meet the minimum node requirements of the tier, control node 12 selects the node from the free pool based the node requirements of the tier, as described above, (94) and assigns the node to the tier (95). As described in detail with respect to FIG. 4, control node 12 may determine whether there are any nodes that have node attributes that are an exact match to the node requirements of the tier. If an exact match is found, the corresponding computing node is assigned to a node slot of the tier. If no exact match is found, control node 12 computes the processing energy for each node and assigns the computing node with the minimum positive processing energy to the tier. Control node 12 remotely powers on the assigned node and remotely boots the node with the image instance associated with the node slot. Additionally, the booted computing node inherits the network address associated with the node slot.

If there are no adequate computing nodes in the free pool, i.e., no nodes at all or no nodes that match the minimal node requirements of the tier, control node 12 identifies the tiers with a lower priority than the tier needing more processing capacity (96).

Control node 12 determines which of the nodes of the lower priority tiers meet the minimum requirements of the tier in need of processing capacity (98). Control node 12 may, for example, compare the attributes of each of the nodes assigned to node slots of the lower priority tiers to the node requirements of the tier in need of processing capacity. Lower priority tiers that have the minimum number of computing nodes may be removed from possible tiers from which to harvest an application node. If, however, all the lower priority tiers have the minimum number of computing nodes defined for the respective tier, the lowest priority tier is selected from which to harvest the one or more nodes.

Control node 12 calculates the processing energy of each of the nodes of the lower priority tiers that meet the minimum requirements (100). The energies of the nodes are calculated using the differences between the node attributes and the node requirements of the tier needing additional capacity. Control node 12 selects the computing node with the lowest processing energy that meets the minimum requirements, and assigns the selected computing node to the tier in need of processing capacity (102, 95).

Figure 6:
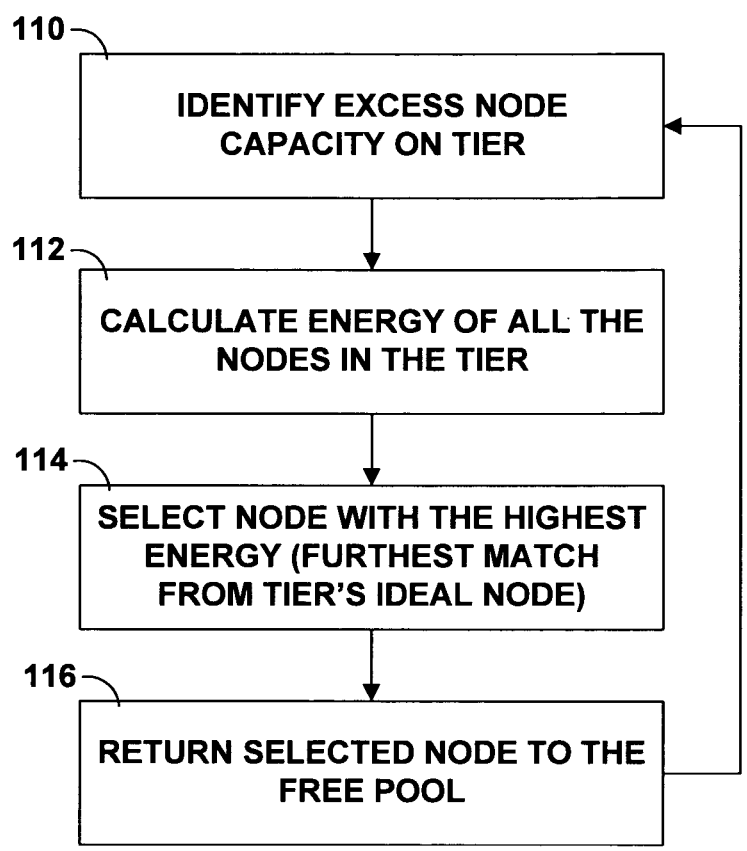
FIG. 6 is a flow diagram illustrating exemplary operation of a control node harvesting excess node capacity from one of the tiers and returning the harvested computing node to the free pool.

FIG. 6 is a flow diagram illustrating exemplary operation of control node 12 when harvesting excess node capacity from one of the tiers and returning the harvested computing node to free pool 13. Initially, control node 12 identifies a tier having excess node capacity (110). Control node 12 may, for example, periodically check the node capacity of the tiers to identify any tiers having excess node capacity. Performing a periodic check and removal of excess nodes increases the likelihood that a capable computing node will be in free pool 13 in the event one of the tiers needs additional node capacity.

When harvesting a node, control node 12 calculates the processing energy of all the nodes in the tier as described above with reference to FIG. 4 (112). Control node 12 identifies the node within the tier with the highest processing energy and returns the identified node to the free pool of nodes (114, 116). As described above, the node with the highest processing energy corresponds to the node whose node attributes are the most in excess of the node requirements of the tier.

Returning the node to the free pool may involve remotely powering off the computing node and updating the database to associate the harvested node with free pool 13. In addition, control node 12 updates the database to disassociate the returned node with the node slot to which it was assigned. At this point, the node no longer uses the network address associated with the image instance mapped to the node slot. Control node 12 may, therefore, assign a temporary network address to the node while the node is assigned to free pool 13.

Figure 7:
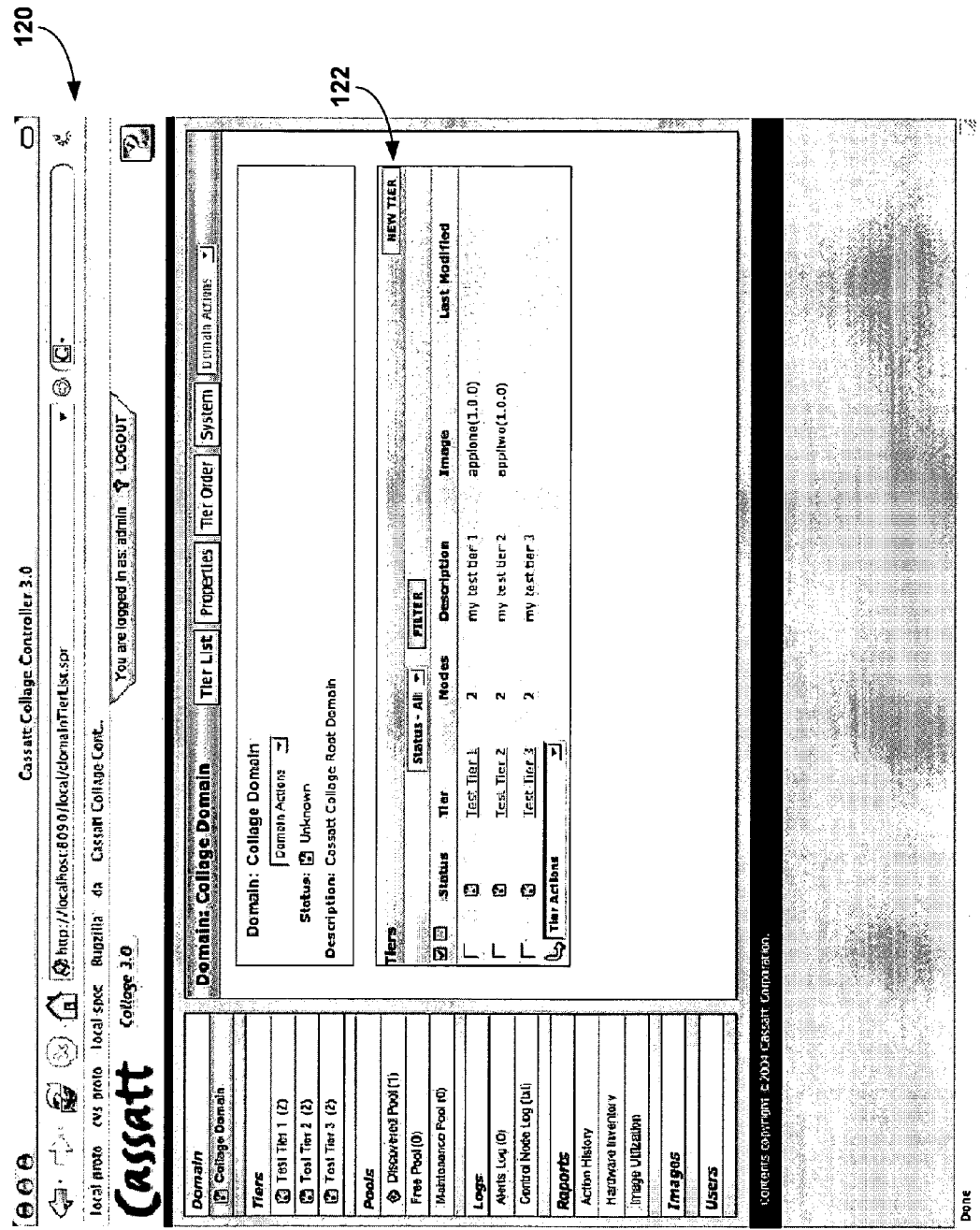
FIG. 7 is a screen illustration of an exemplary user interface for defining tiers in a particular domain.

FIG. 7 is a screen illustration of an exemplary user interface 120 presented by control node 12 with which administrator 20 interacts to define tiers for a particular domain. In the example illustrated in FIG. 7, system administrator 20 has selected the "Collage Domain." User interface 120 presents the tiers that are currently in the selected domain. In the example illustrated, the Collage Domain includes three tiers, "test tier 1," "test tier 2," and "test tier 3." As shown in FIG. 7, in this example, each of the tiers includes two nodes. In addition, user interface 120 lists the type of software image currently deployed to application nodes for each of the tiers. In the example illustrated, image "applone (1.0.0)" is deployed to the nodes of test tier 1 and image "appltwo (1.0.0)" is deployed to the nodes of test tier 2. System administrator 20 may add one or more tiers to the domain by clicking on new tier button 122.

Figure 8:
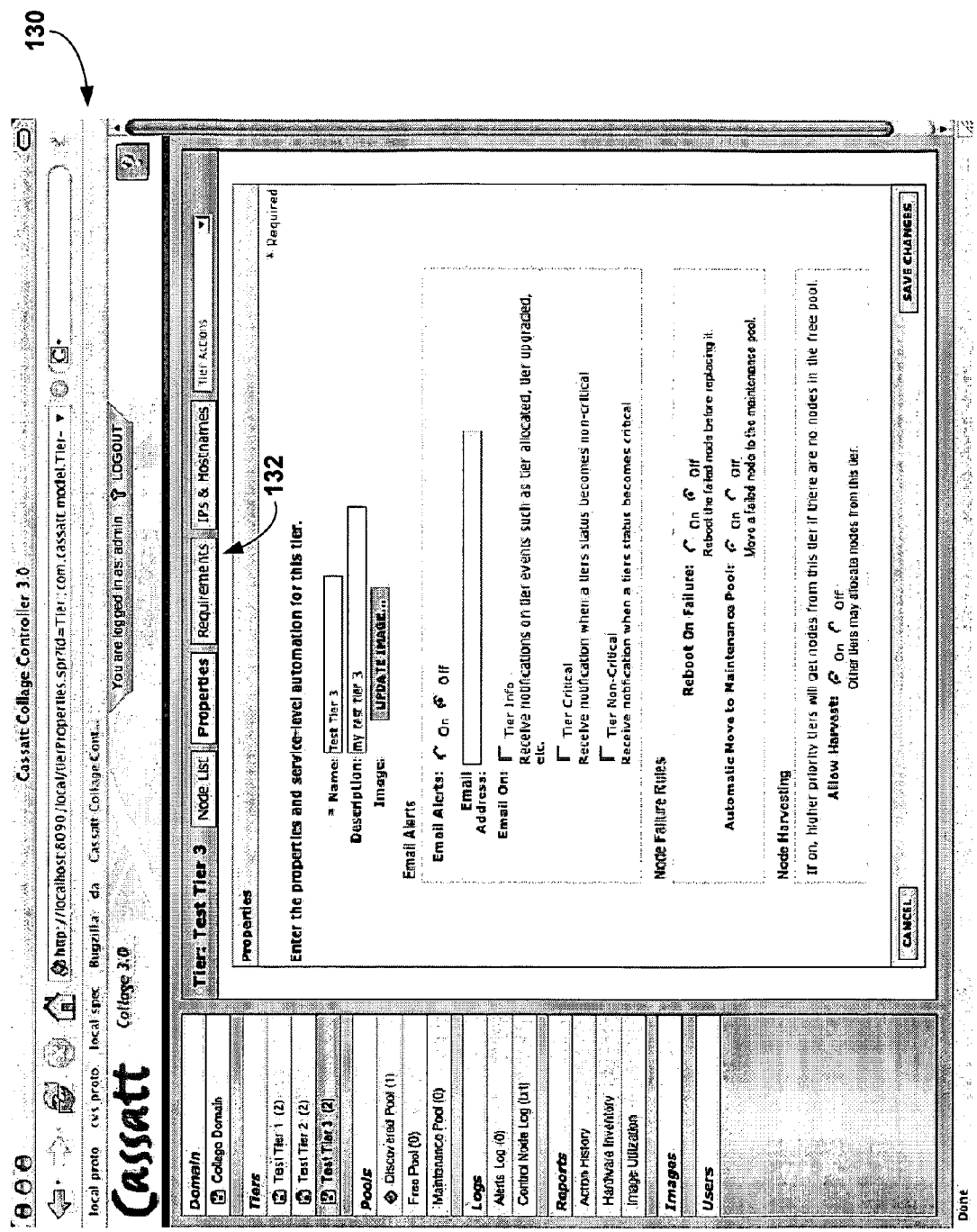
FIG. 8 is a screen illustration of an exemplary user interface for defining properties of the tiers.

FIG. 8 is a screen illustration of an exemplary user interface 130 for defining properties of the tiers. In particular, user interface 130 allows system administrator 20 to input a name for the tier, a description of the tier, and an image associated with the tier. The image associated with the tier refers to a master image from which image instances are generated and deployed to the nodes assigned to the tier.

When configuring a tier, system administrator 20 may elect to activate email alerts. For example, system administrator 20 may activate the email alerts feature in order to receive email alerts providing system administrator 20 with critical and/or non-critical tier information, such as a notification that a tier has been upgraded, a node of the tier has failed or the like. Furthermore, system administrator 20 may input various policies, such node failure rules. For example, system administrator 20 may identify whether control node 12 should reboot a node in case of failure or whether the failed node should automatically be moved to maintenance pool 17. Similarly, system administrator 20 may identify whether nodes assigned to the tier may be harvested by other tiers.

User interface 130 may also allow system administrator 20 to input node requirements of a tier. In order to input node requirements of a tier, system administrator 20 may click on the "Requirements" tab 132, causing user interface 130 to present an input area to particular node requirements of the tier.

Figure 9:
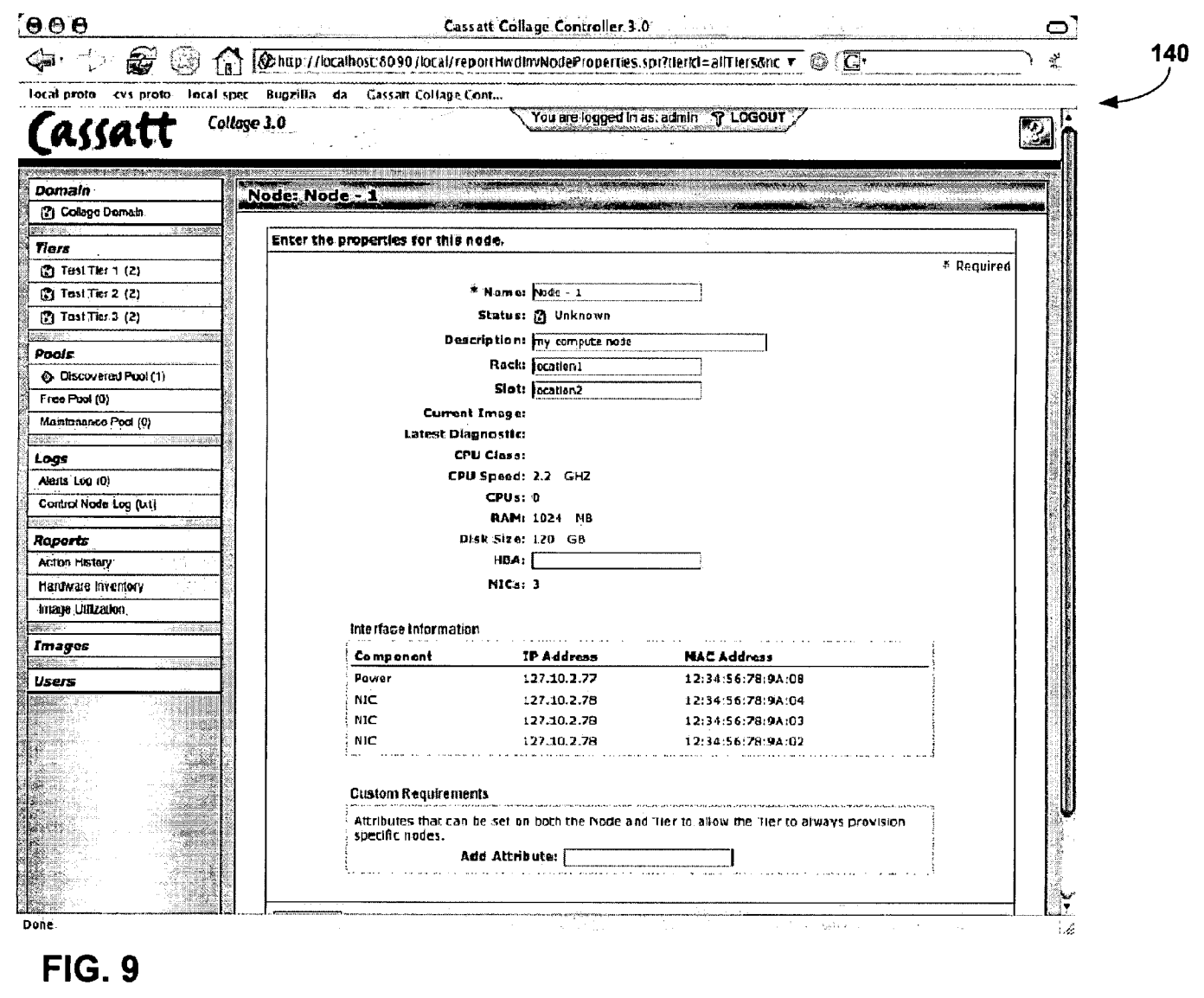

FIG. 9 is a screen illustration of an exemplary user interface 140 for viewing and identifying properties of a computing node. User interface 140 allows system administrator 20 to define a name, description, and location (including a rack and slot) of a computing node. In addition user interface 140 may specify user-defined properties of a node, such as whether the computing node has I/O HBA capabilities.

User interface 140 also displays properties that control node 12 has identified during the computing node inventory process. In this example, user interface 140 presents system administrator 20 with the a CPU node count, a CPU speed, the amount of RAM, the disk size and other characteristics that are identifiable during the automated node inventory. User interface 140 additionally presents interface information to system administrator 20. Specifically, user interface 140 provides system administrator 20 with a list of components and their associated IP and MAC addresses.

User interface 140 also allows system administrator 20 to define other custom requirements. For example, system administrator 20 may define one or more attributes and add those attributes to the list of node attributes presented to system administrator 20.

Figure 10:
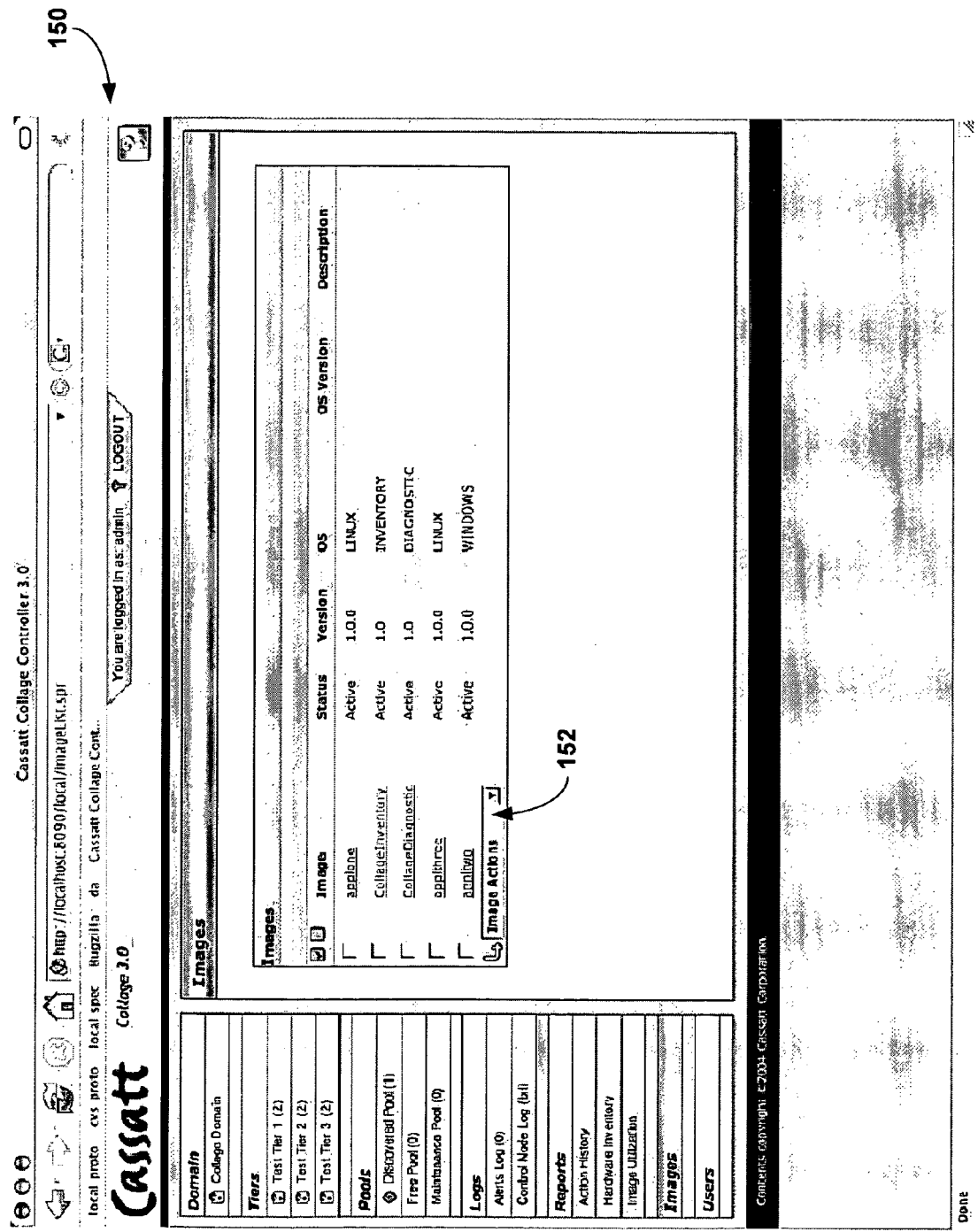
FIG. 10 is a screen illustration of an exemplary user interface for viewing software images.

FIG. 10 is a screen illustration of an exemplary user interface 150 for viewing software images. User interface 150 presents to a system administrator or another user a list of images maintained by control node 12 within image repository 26. The image list further includes the status of each image (i.e., either active or inactive), the version of the image, the operating system on which the image should be run, the operating system version on which the image should be run and a brief description of the image.

System administrator 20 or another user may select an image by clicking on the box in front of the image identifier/name and perform one or more actions on the image. Actions that system administrator 20 may perform on an image include deleting the image, updating the image, and the like. System administrator 20 may select one of the image actions via dropdown menu 152. In some embodiments, user interface 150 may further display other details about the images such as the node to which the images are assigned (if the node status is "active"), the network address associated with the images and the like.

Figure 11:
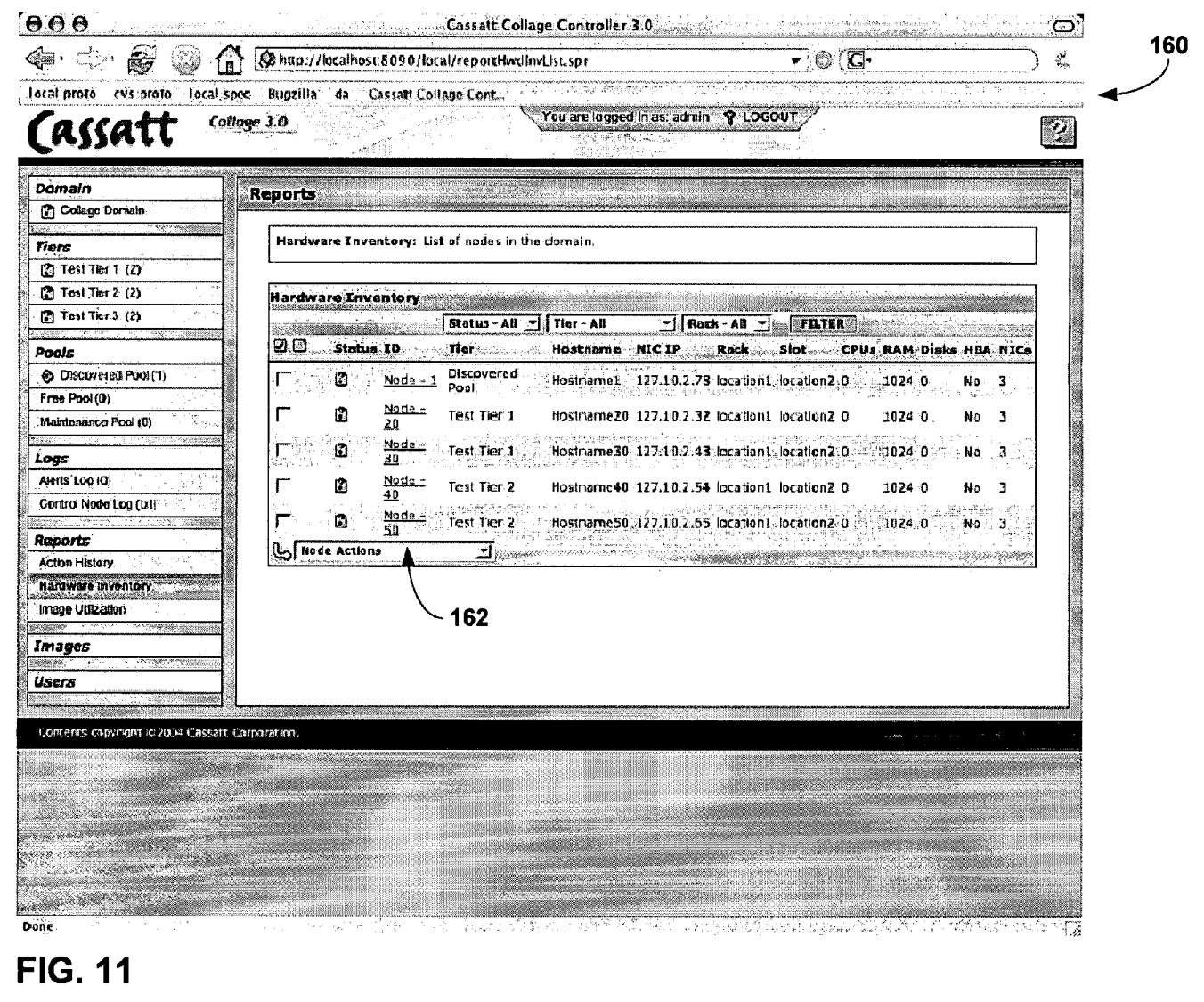

FIG. 11 is a screen illustration of an exemplary user interface 160 for viewing a hardware inventory report. User interface 160 presents to system administrator 20 or another user a list of the nodes that are currently assigned to a domain. System administrator 20 may elect to view the nodes for the entire domain, for a single tier within the domain or for a single rack within a tier.

For each node, user interface 160 presents a node ID, a status of the node, the tier to which the node belongs, a hostname associated with the node, a NIC IP address, a rack location, a slot location, the number of CPU's of the node, the amount of RAM on the node, the number of disks on the node, whether the node has I/O HBA, and the number of NICs of the node.

System administrator 20 or other user may select a node by clicking on the box in front of the node identifier/name and perform one or more actions on the node. Actions that system administrator 20 may perform on the node include deleting the node, updating the node attributes or other properties of the node, and the like. System administrator 20 may select one of the node actions via dropdown menu 162.

Figure 12:
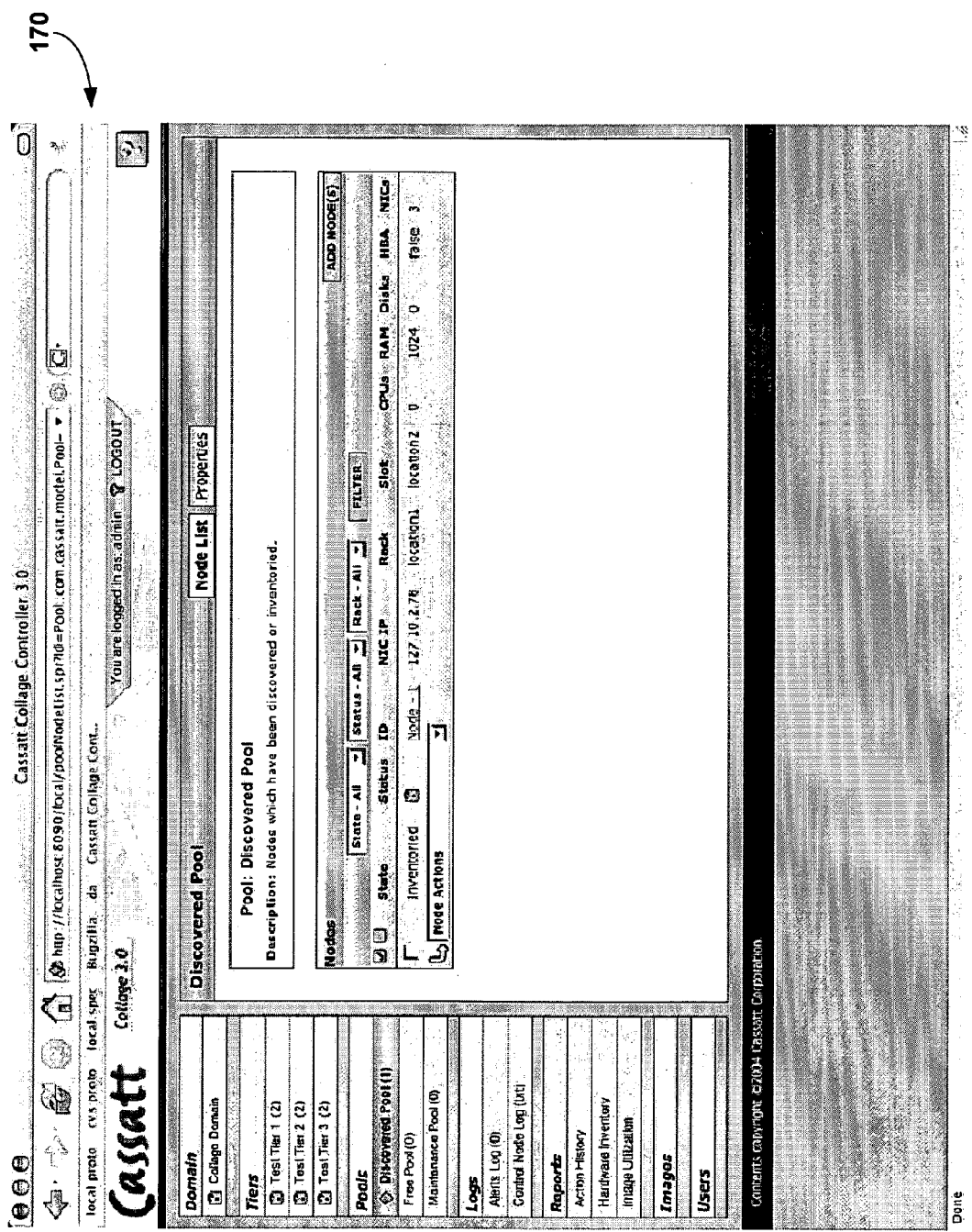
FIG. 12 is a screen illustration of an exemplary user interface for viewing discovered nodes that are located in the free pool.

FIG. 12 is a screen illustration of an exemplary user interface 170 for viewing discovered nodes that are located in discovered pool 11. For each node, user interface 170 presents a node ID, a state of the node, a NIC IP address, a rack location, a slot location, the number of CPU's of the node, the amount of RAM on the node, the number of disks on the node, whether the node has I/O HBA, and the number of NICs of the node.

Figure 13:
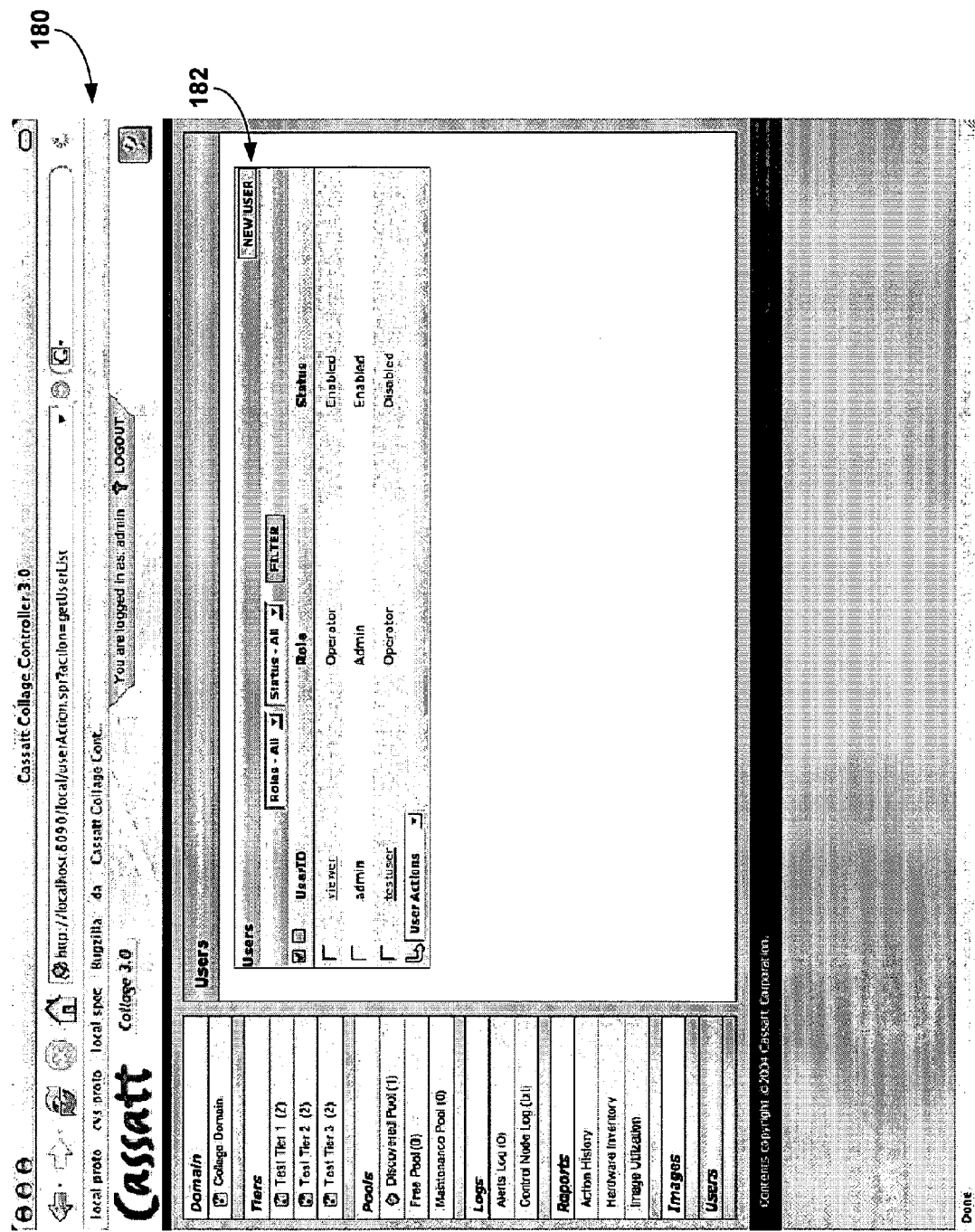
FIG. 13 is a screen illustration of an exemplary user interface for viewing users of a distributed computing system.

FIG. 13 is a screen illustration of an exemplary user interface 180 for viewing users of distributed computing system 10. User interface 180 presents a list of users as well as the role assigned to each of the users and the status of each of the users. Thus, system administrator 20 may define different roles to each of the users. For example, a user may be either an operator (i.e., general user) or an administrator. System administrator 20 may add a new user to the list of users by clicking on the "New User" button 182.

Figure 14:
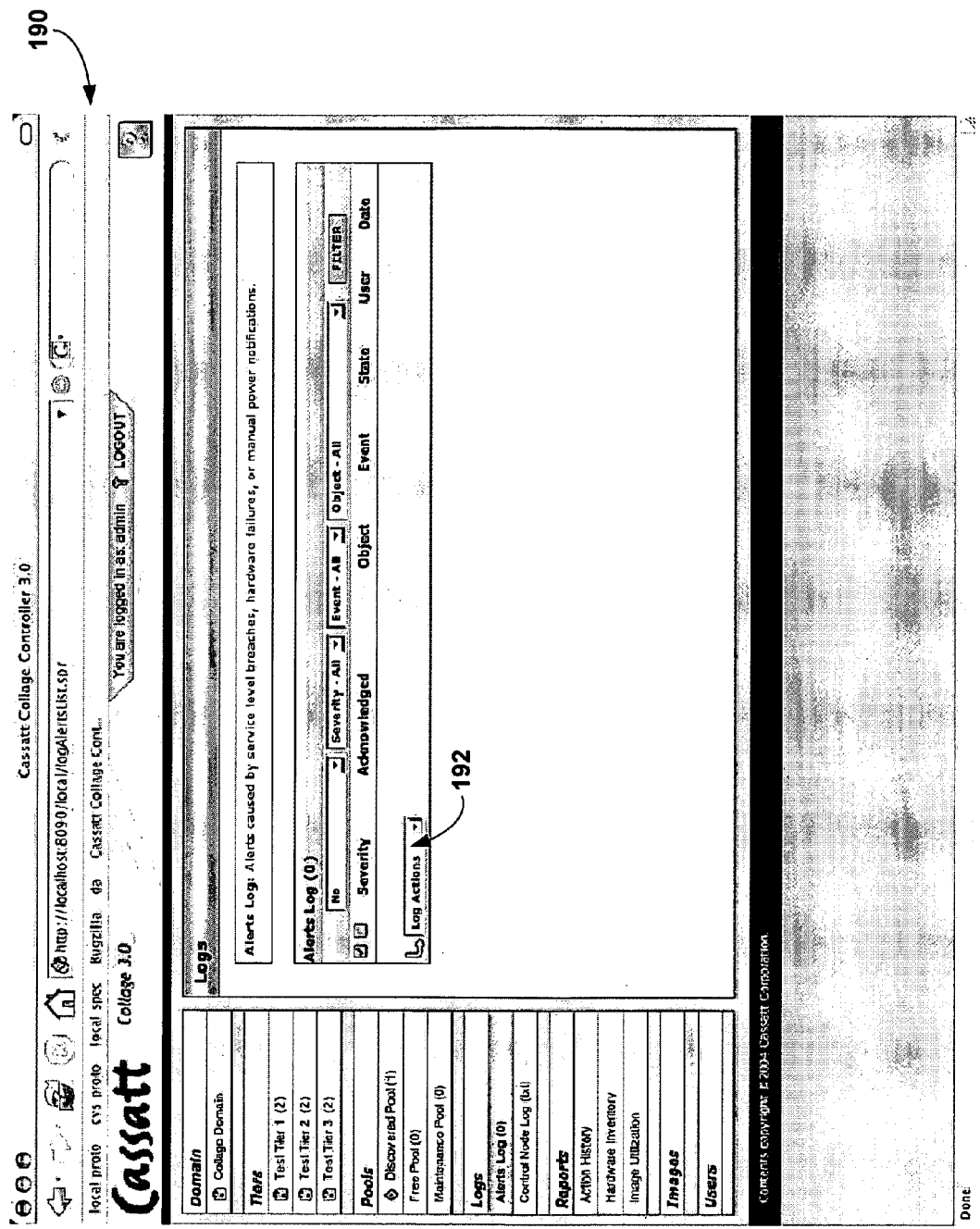
FIG. 14 is a screen illustration of an exemplary user interface for viewing alerts for the distributed computing system.

FIG. 14 is a screen illustration of an exemplary user interface 190 for viewing alerts for distributed computing system 10. For each of the alerts, user interface 190 identifies the severity of the alert, whether the alert has been acknowledged, an object associated with the alert, an event associated with the alert, a state of the alert, a user associated with the alert and a date associated with the alert.

System administrator 20 or other user may select an alert by clicking on the box in front of the logged alert and perform one or more actions on the logged alert. Actions that system administrator 20 may perform include deleting the alert, changing the status of the alert, or the like. System administrator 20 may specify the log actions via dropdown menu 192.

Figure 15:
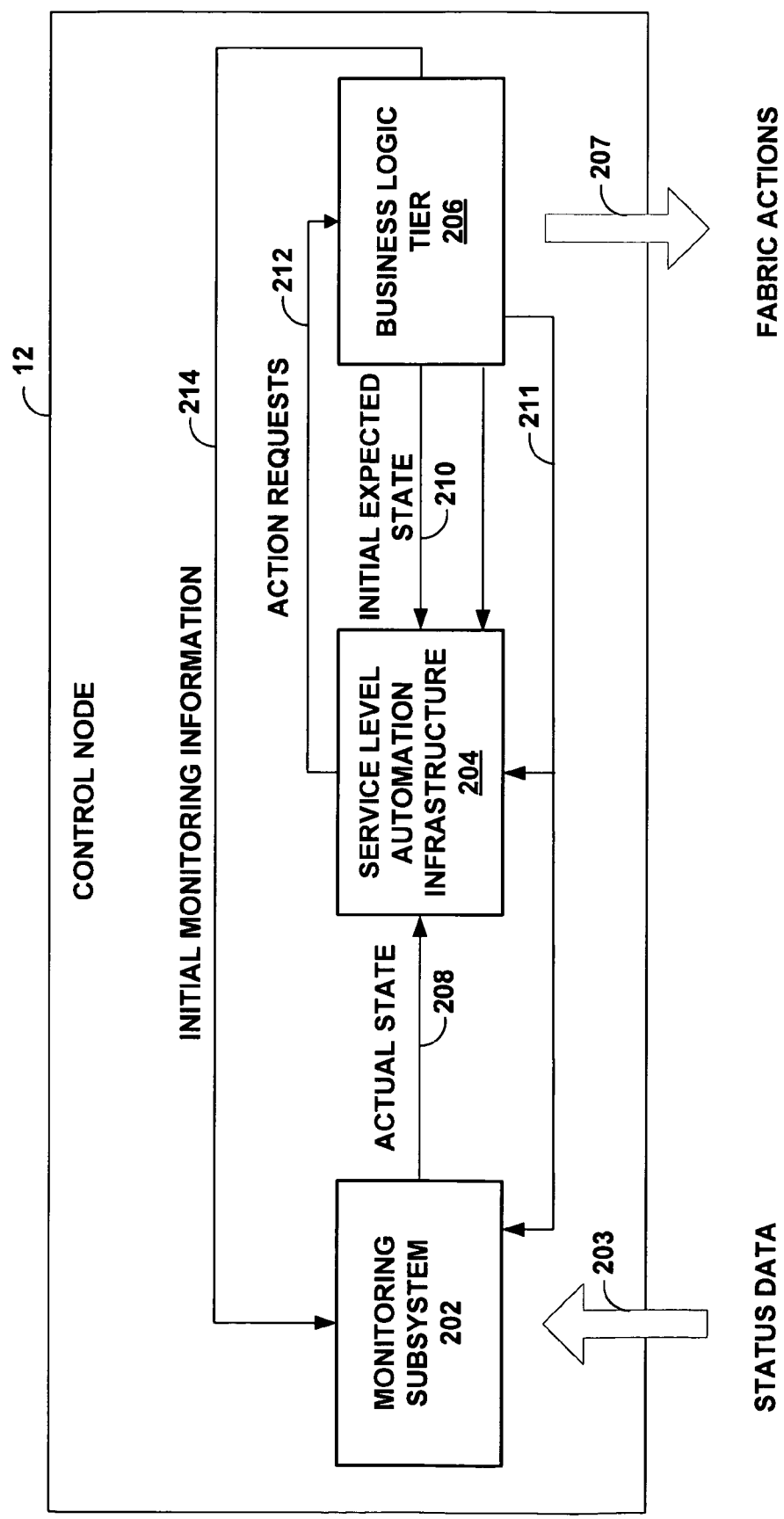
FIG. 15 is a block diagram illustrating one embodiment of control node that includes a monitoring subsystem, a service level automation infrastructure (SLAI), and a business logic tier (BLT).

FIG. 15 is a block diagram illustrating one embodiment of control node 12 in further detail. In the illustrated example, control node 12 includes a monitoring subsystem 202, a service level automation infrastructure (SLAI) 204, and a business logic tier (BLT) 206.

Monitoring subsystem 202 provides real-time monitoring of the distributed computing system 10. In particular, monitoring subsystem 202 dynamically collects status data 203 from the hardware and software operating within distributed computing system 10, and feeds the status data in the form of monitor inputs 208 to SLAI 204. Monitoring inputs 208 may be viewed as representing the actual state of the fabric defined for the organizational model implemented by distributed computing system 10. Monitoring subsystem 202 may utilize well defined interfaces, e.g., the Simple Network Management Protocol (SNMP) and the Java Management Extensions (JMX), to collect and export real-time monitoring information to SLAI 204.

SLAI 204 may be viewed as an automation subsystem that provides support for autonomic computing and acts as a central nervous system for the controlled fabric. In general, SLAI 204 receives monitoring inputs 208 from monitoring subsystem 202, analyzes the inputs and outputs appropriate action requests 212 to BLT 206. In one embodiment, SLAI 204 is a cybernetic system that controls the defined fabric via feedback loops. More specifically, administrator 20 may interact with BLT 206 to define an expected state 210 for the fabric. BLT 206 communicates expected state 210 to SLAI 204. SLAI 204 receives the monitoring inputs from monitoring subsystem 202 and applies rules to determine the most effective way of reducing the differences between the expected and actual states for the fabric.

For example, SLAI 204 may apply a rule to determine that a node within a high priority tier has failed and that the node should be replaced by harvesting a node from a lower priority tier. In this example, SLAI 204 outputs an action request 212 to invoke BLT 206 to move a node from one tier to the other.

In general, BLT 206 implements high-level business operations on fabrics, domains and tiers. SLAI 204 invokes BLT 206 to bring the actual state of the fabric into accordance with the expected state. In particular, BLT 206 outputs fabric actions 207 to perform the physical fabric changes. In addition, BLT 206 outputs an initial expected state 210 to SLAI 204 and initial monitoring information 214 to SLAI 204 and monitoring subsystem 202, respectively. In addition, BLT 206 outputs notifications 211 to SLAI 204 and monitoring subsystem 202 to indicate the state and monitoring changes to distributed computing system 10. As one example, BLT 206 may provide control operations that can be used to replace failed nodes. For example, BLT 206 may output an action request indicating that a node having address 10.10.10.10 has been removed from tier ABC and a node having address 10.10.10.11 has been added to tier XYZ. In response, monitoring subsystem 202 stops attempting to collect status data 203 from node 10.10.10.10 and starts monitoring for status data from node 10.10.10.11. In addition, SLAI 204 updates an internal model to automatically associate monitoring inputs from node 10.10.10.11 with tier XYZ.

Figure 16:
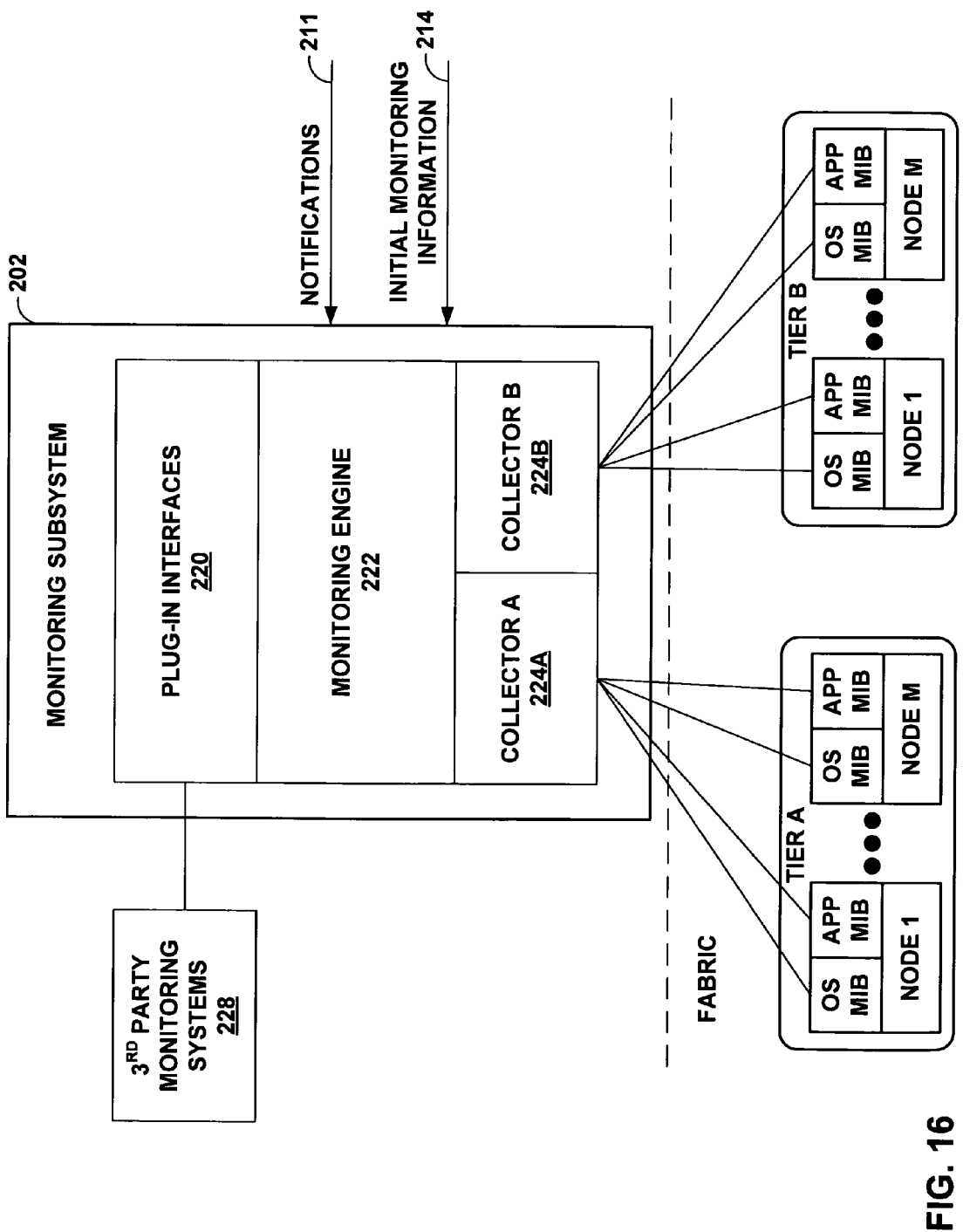
FIG. 16 is a block diagram illustrating one embodiment of the monitoring subsystem.

FIG. 16 is a block diagram illustrating one embodiment of monitoring subsystem 202. In general, monitoring subsystem 202 dynamically detects and monitors a variety of hardware and software components within the fabric. For example, monitoring subsystem 202 identifies, in a timely and efficient manner, any computing nodes that have failed, i.e., any node that does not respond to a request to a known service. More generally, monitoring subsystem 202 provides a concise, consistent and constantly updating view of the components of the fabric.

As described further below, monitoring subsystem 202 employs a modular architecture that allows new detection and monitoring collectors 224 to be "plugged-in" for existing and new protocols and for existing and new hardware and software. As illustrated in FIG. 16, monitoring subsystem 202 provides a plug-in architecture that allows different information collectors 224 to be installed. In general, collectors 224 are responsible for protocol-specific collection of monitoring information. The plug-in architecture allows for new protocols to be added by simply adhering to a collector plug-in signature. In this example, monitoring subsystem 202 includes collectors 224A and 224B for collecting information from operating systems and applications executing on nodes within tier A and tier B, respectively.

In one embodiment, collectors 224 are loaded at startup of control node 12 and are configured with information retrieved from BLT 206. Monitoring engine 222 receives collection requests from SLAI 204, sorts and prioritizes the requests, and invokes the appropriate one of collectors 224 based on the protocol specified in the collection requests. The invoked collector is responsible for collecting the required status data and returning the status data to monitoring engine 222. If the collector is unable to collect the requested status data, the collector returns an error code.

In one embodiment, collectors 224 are Java code compiled into a jar file and loaded with a class loader at run time. Each of collectors 224 has an associated configuration file written in a data description language, such as the extensible markup language (XML). In addition, a user may interact with BLT 206 to add run-time configuration to dynamically configure collectors 224 for specific computing environments. Each of collectors 224 expose an application programming interface (API) to monitoring engine 222 for communication and data exchange.

A user, such as a system administrator, specifies the protocol or protocols to be used for monitoring a software image when the image is created. In addition, the users may specify the protocols to be used for monitoring the nodes and each service executing on the nodes. Example protocols supported by the collectors 224 include Secure Shell (SSH), Simple Network Management Protocol (SNMP), Internet Control Message Protocol (ICMP) ping, Java Management Extensions (JMX) and the Hypertext Transfer Protocol (HTTP).

Some protocols require special privileges, e.g., root privileges, to perform the required data collection. In this case, the corresponding collectors 224 communicate with a separate process that executes as the root. Moreover, some protocols may require deployment and/or configuration of data providers within the fabric. Software agents may, for example, be installed and configured on nodes and configured on other hardware. If needed, custom in-fabric components may be deployed.

In this example, the modular architecture of monitoring subsystem 202 also supports one or more plug-in interfaces 220 for data collection from a wide range of third-party monitoring systems 228. Third-party monitoring systems 228 monitor portions of the fabric and may be vendor-specific.

Figure 17:
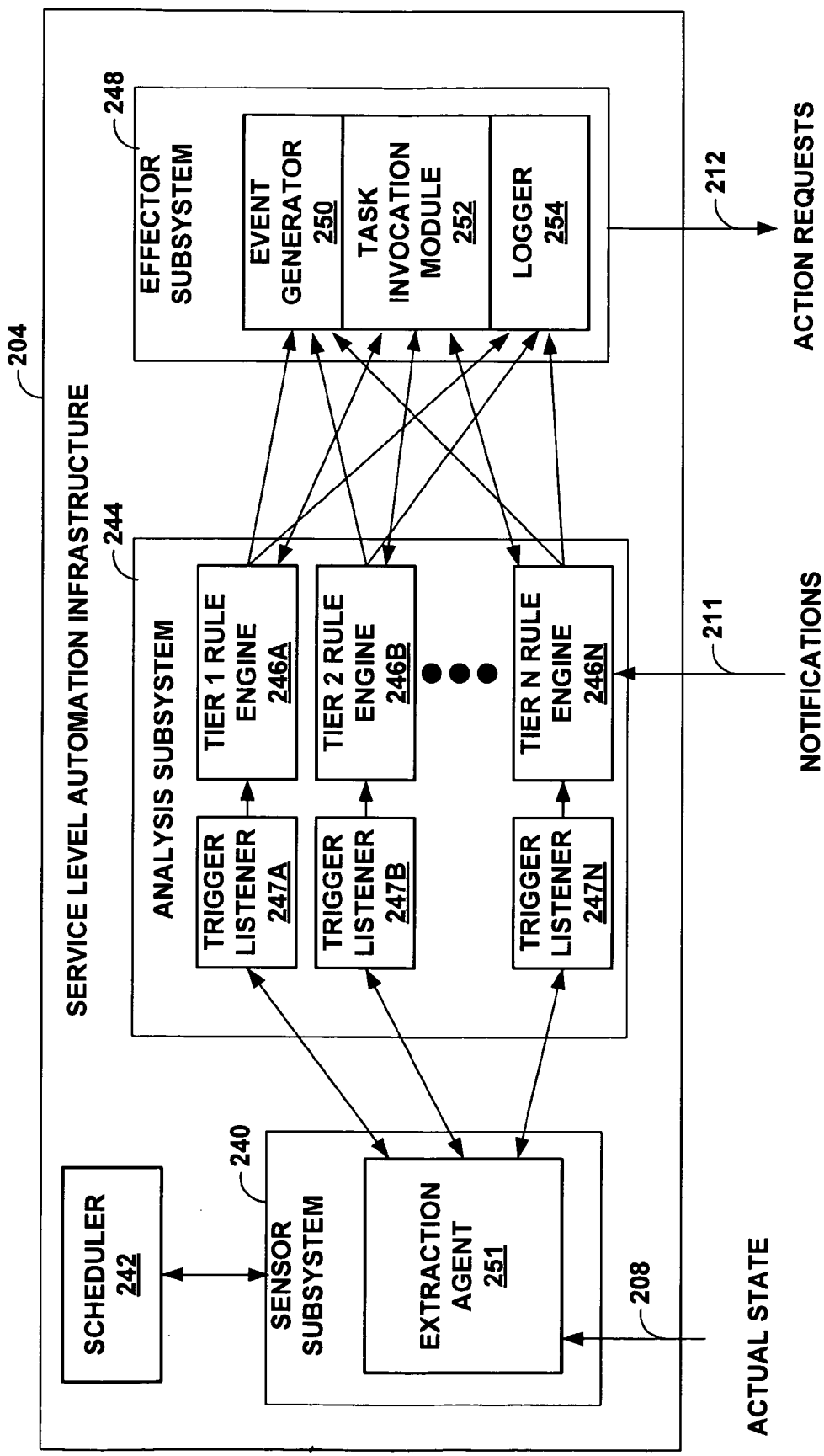
FIG. 17 is a block diagram illustrating one embodiment of the SLAI in further detail.

FIG. 17 is a block diagram illustrating one embodiment of SLAI 204 in further detail. In the illustrated embodiment, SLAI 204 is composed of three subsystems: a sensor subsystem 240, an analysis subsystem 244 and an effector subsystem 248.

In general, sensor subsystem 240 receives actual state data from monitoring subsystem 202 in the form of monitoring inputs 208 and supplies ongoing, dynamic input data to analysis subsystem 244. For example, sensor subsystem 240 is notified of physical changes to distributed computing system 10 by monitoring subsystem 202. Sensor subsystem 240 uses the state data received from monitoring subsystem 202 to maintain ongoing, calculated values that can be sent to analysis subsystem 244 in accordance with scheduler 242.

In one embodiment, sensor subsystem 240 performs time-based hierarchical data aggregation of the actual state data in accordance with the defined organization model. Sensor subsystem 240 maintains organizational data in a tree-like structure that reflects the current configuration of the hierarchical organization model. Sensor subsystem 240 uses the organizational data to perform the real-time data aggregation and map tiers and domains to specific nodes. Sensor subsystem 240 maintains the organizational data based on notifications 211 received from BLT 206.

Sensor subsystem 240 sends inputs to analysis subsystem 244 to communicate the aggregated data on a periodic or event-driven basis. Analysis subsystem 244 may register an interest in a particular aggregated data value with sensor subsystem 240 and request updates at a specified frequency. In response, sensor subsystem 240 interacts with monitoring subsystem 202 and scheduler 242 to generate the aggregated data required by analysis subsystem 244.

Sensor subsystem 240 performs arbitrary data aggregations via instances of plug-in classes (referred to as "triggers") that define the aggregations. Each trigger is registered under a compound name based on the entity being monitored and the type of data being gathered. For example, a trigger may be defined to aggregate and compute an average computing load for a tier every five minutes. Analysis subsystem 244 requests the aggregated data based on the registered names. In some embodiments, analysis subsystem 244 may define calculations directly and pass them to sensor subsystem 240 dynamically.

Analysis subsystem 244 is composed of a plurality of forward chaining rule engines 246A-246N. In general, rule engines 246 match patterns in a combination of configuration data and monitoring data, which is presented by extraction agent 251 in the form of events. Events contain the aggregated data values that are sent to rule engines 246 in accordance with scheduler 242.

Sensor subsystem 240 may interact with analysis subsystem 244 via trigger listeners 247 that receives updates from a trigger within sensor subsystem 240 when specified events occur. An event may be based on system state (e.g., a node transitioning to an up or down state) or may be time based.

Analysis subsystem 244 allows rule sets to be loaded in source form and compiled at load time into discrimination networks. Each rule set specifies trigger-delivered attributes. Upon loading the rule sets, analysis subsystem 244 establishes trigger listeners 247 to receive sensor notifications and update respective working memories of rule engines 246. As illustrated in FIG. 17, each of rule engines 246 may serve a different tier defined within the fabric. Alternatively, multiple rule engines 246 may serve a single tier or a single rule engine may serve multiple tiers.

Rule engines 246 process the events and invoke action requests via calls to effector subsystem 248. In addition, rule engines 246 provide a call-back interface so that effector subsystem 248 can inform a rule engine when an action has completed. Rule engines 246 prevent a particular rule from re-firing as long as any action invoked by the rule has not finished. In general, rules contain notification calls and service invocations though either may be disabled by configuration of effector subsystem 248. BLT 206 supplies initial system configuration descriptions to seed each of rule engines 246.

In general, rule engines 246 analyze the events and discover discrepancies between an expected state of the fabric and an actual state. Each of rule engines 246 may be viewed as software that performs logical reasoning using knowledge encoded in high-level condition-action rules. Each of rule engines 246 applies automated reasoning that works forward from preconditions to goals defined by system administrator 20. For example, rule engines 246 may apply modus ponens inferences rules.

Rule engines 246 output requests to effector subsystem 248 which produce actions requests 212 for BLT 206 to resolve the discrepancies. Effector subsystem 248 performs all operations on behalf of analysis subsystem 244. For example, event generator 250, task invocation module 252 and logger 254 of effector subsystem 248 perform event generation, BLT action invocation and rule logging, respectively. More specifically, task invocation module 252 invokes asynchronous operations within BLT 206. In response, BLT 206 creates a new thread of control for each task which is tracked by a unique task identifier (task id). Rules engine 246 uses the task id to determine when a task completes and, if needed, to re-fire any rules that were pended until completion of the task. These tasks may take arbitrary amounts of time, and rules engine 246 tracks the progress of individual task via change notifications 211 produced by BLT 206.

Event generator 250 creates persistent event records of the state of processing of SLAI 204 and stores the event records within a database. Clients uses these event records to track progress and determine the current state of the SLAI 204.

Logger 254 generates detailed trace information about system activities for use in rule development and debugging. The logging level can be raised or lowered as needed without changing operation of SLAI 204.

Figure 18:
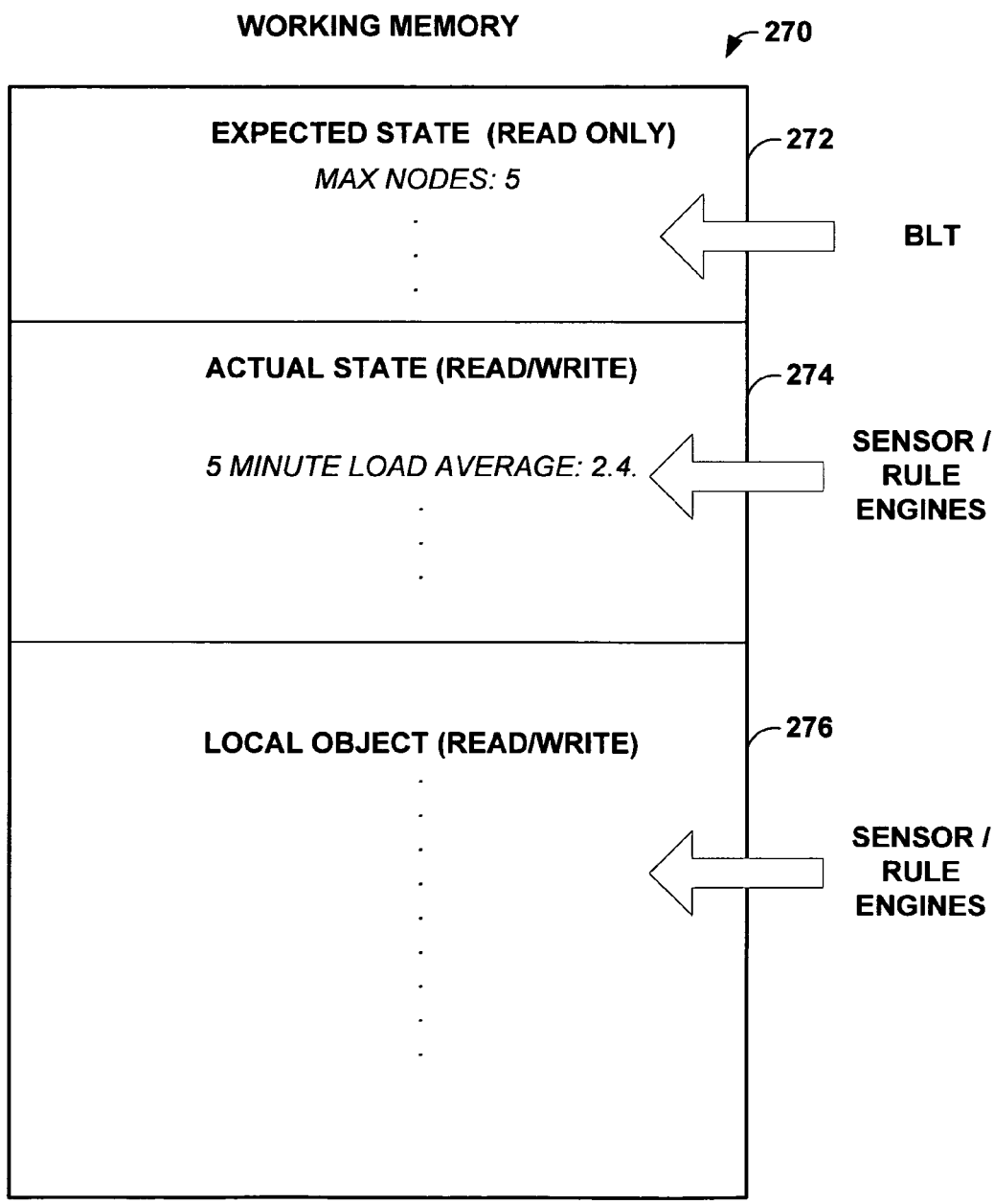
FIG. 18 is a block diagram of an example working memory associated with rule engines of the SLAI.

FIG. 18 is a block diagram of an example working memory 270 associated with rule engines 246. In this example, working memory 270 includes a read-only first data region 272 that stores the expected state received from BLT 206. Data region 272 is read-only in the sense that it cannot be modified in response to a trigger from sensor subsystem 240 or by rule engines 246 without notification from BLT 206.

In addition, working memory 270 includes a second data region 274 that is modifiable (i.e., read/write) and may be updated by monitoring subsystem 202 or used internally by rule engines 246. In general, data region 274 stores aggregated data representing the actual state of the fabric and can be updated by sensor subsystem 240 or by rule engines 246. The actual state may consist of a set of property annotations that can be attached to objects received from BLT 206 or to objects locally defined within a rule engine, such as local object 276.

Figure 19:
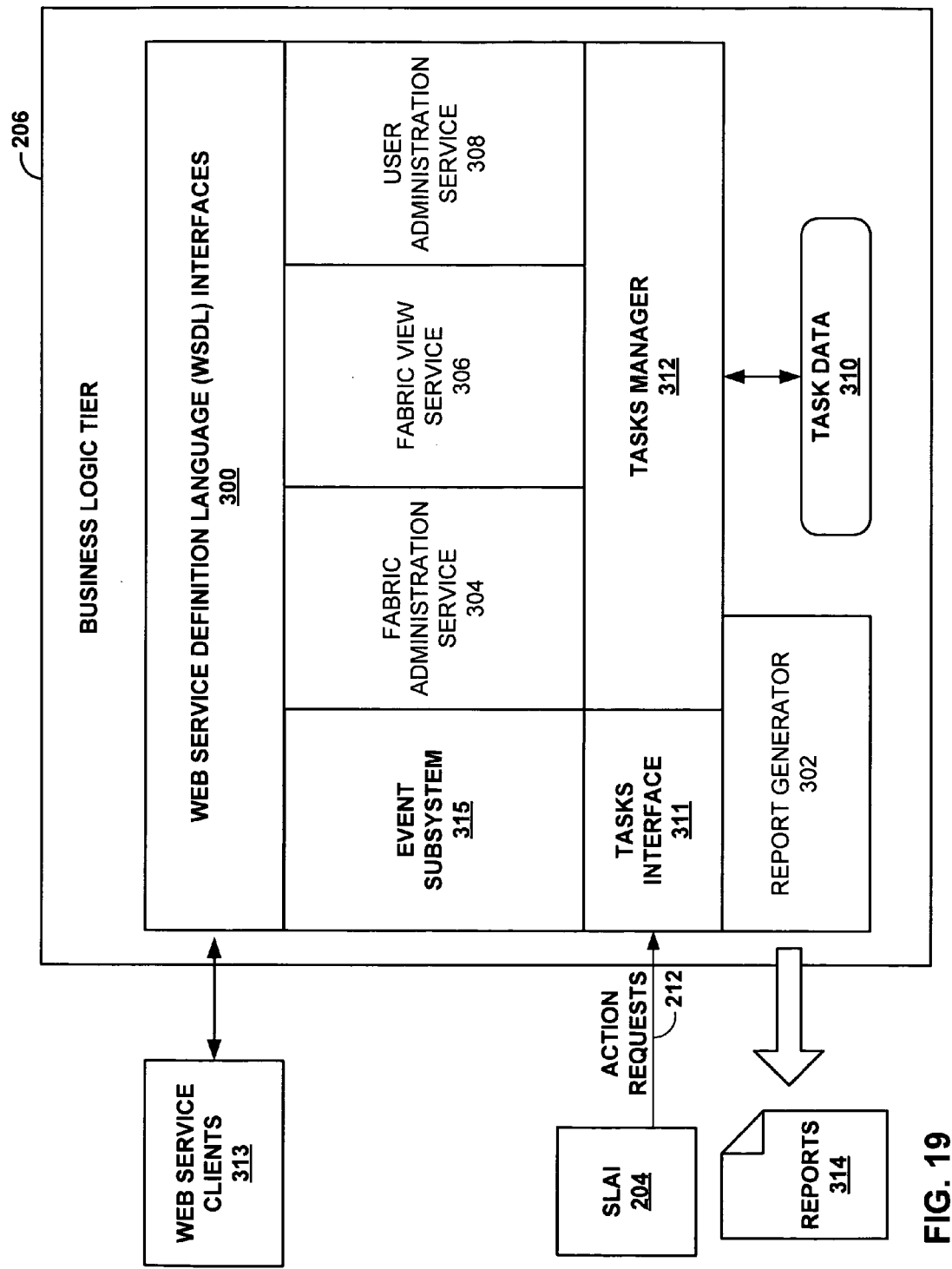
FIG. 19 is a block diagram illustrating an example embodiment for the BLT of the control node.

FIG. 19 is a block diagram illustrating an example embodiment for BLT 206. In this example, BLT 206 includes a set of one or more web service definition language (WSDL) interfaces 300, a report generator 302, a fabric administration interface service 304, a fabric view service 306, a user administration service 308, a task interface 311, a task manager 312 and an event subsystem 315.

As described, BLT 206 provides the facilities necessary to create and administer the organizational model (e.g., fabric, domains, tiers and nodes) implemented by distributed computing system 10. In general, BLT 206 abstracts access to the persisted configuration state of the fabric, and controls the interactions with interfaces to fabric hardware services. As such, BLT 206 provides fabric management capabilities, such as the ability to create a tier and replace a failed node. WSDL interfaces 300 provide web service interfaces to the functionality of BLT 206 that may be invoked by web service clients 313. Many of WSDL interfaces 300 offered by BLT 206 allow administrator 20 to define goals, such as specifying a goal of the expected state of the fabric. As further described below, rule engines 246 within SLAI 204, in turn, invoke task manger 312 to initiate one or more BLT tasks to achieve the specified goal. In general, web service clients 313 may be presentation layer applications, command line applications, or other clients.

BLT 206 abstracts all interaction with physical hardware for web service clients 313. BLT 206 is an enabling component for autonomic management behavior, but does not respond to real-time events that either prevent a goal from being achieved or produce a set of deviations between the expected state and the actual state of the system. In contrast, BLT 206 originates goals for autonomic reactions to changing configuration and state. SLAI 204 analyzes and acts upon these goals along with real-time state changes. BLT 206 sets the goals to which SLAI 204 strives to achieve, and provides functionality used by the SLAI in order to achieve the goals.

In general, BLT 206 does not dictate the steps taken in pursuit of a goal since these are likely to change based on the current state of distributed computing system 10 and changes to configurable policy. SLAI 204 makes these decisions based on the configured rule sets for the fabric and by evaluating monitoring data received from monitoring subsystem 202.

Fabric administration service 304 implements a set of methods for managing all aspects of the fabric. Example methods include methods for adding, viewing, updating and removing domains, tiers, nodes, notifications, assets, applications, software images, connectors, and monitors. Other example methods include controlling power at a node, and cloning, capturing, importing, exporting or upgrading software images. Rule engines 246 of SLAI 204 may, for example, invoke these methods by issuing action requests 212.

Task manager 312 receives action requests 212 via task interface 311. In general, task interface 311 provides an interface for receiving action requests 212 from SLAI 204 or other internal subsystem. In response, task manager 312 manages asynchronous and long running actions and are invoked by SLAI 204 to satisfy a goal or perform an action requested by a client.

Task manager 312 generates task data 310 that represents identification and status for each task. Task manager 312 returns a task identifier to the calling web service clients 313 or the internal subsystem, e.g., SLAI 204, that initiated the task. Rule engines 246 and web service clients 313 use the task identifiers to track progress and retrieve output, results, and errors associated with achieving the goal.

In one embodiment, there are no WSDL interfaces 300 for initiating specific tasks. Rather, administrator 20 interacts with BLT 206 though goal interfaces presented by WSDL interfaces 300 to define the goals for the fabric. In contrast, the term task is used to refer to internal system constructs that require no user interaction. Tasks are distinct, low-level units of work that affect the state of the fabric. SLAI 204 may combine tasks to achieve or maintain a goal state.

For example, administrator 20 can request configuration changes by either adding new goals to an object or by modifying the attributes on existing goals. Scheduled goals apply a configuration at a designated time. For example, the goals for a particular tier may specify the minimum, maximum, and target node counts for that tier. As a result, the tier can increase or decrease current node capacity by scheduling goals with different configuration values.

This may be useful, for example, in scheduling a software image upgrade. As another example, entire domains may transition online and offline per a defined grid schedule. Administrator 20 may mix and match goals on a component to achieve configurations specific to the application and environment. For example, a tier that does not support autonomic node replacement would not be configured with a harvesting goal.

In some embodiments, goals are either "in force" or "out of force." SLAI 204 only works to achieve and maintain those goals that are currently in force. SLAI 204 may applies a concept of "gravity" as the goals transition from in force to out of force. For example, SLAI 204 may transition a tier offline when an online goal is marked out of force. Some goal types may have prerequisite goals. For example, an image upgrade goal may require as a prerequisite that a tier be transitioned to offline before the image upgrade can be performed. In other embodiments, goals are always in force until modified.

SLAI 204 may automatically formulate dependencies between goals or may allow a user to specify the dependencies. For example, a user may request that a newly created tier come online. As a result of this goal, SLAI 204 may automatically direct task manager 312 to generate a task of harvesting a target number of nodes to enable the tier. Generally, all goals remain in-force by SLAI 204 until modified by BLT 206. In one embodiment, each goal remains in-force in one of three states: Satisfied, Warning, or Critical depending on how successful SLAI 204 was in achieving the goal at the time the event record was generated and stored.

In this manner, SLAI 204 controls the life cycle of a goal (i.e., the creation, scheduling, update, deletion of the goal), and provides a common implementation of these and other services such as timeout, event writing, goal conflicts, management of intra-goal dependencies, and tracking tasks to achieving the goals.

Progress toward a goal is tracked though event subsystem 315. In particular, event subsystem 315 tracks the progress of each in force goal based on the goal identifiers. Tasks executed to achieve a particular goal produce events to communicate result or errors. The events provide a convenient time-based view of all actions and behaviors.

Examples of goal types that may be defined by administrator 20 include software image management goals, node allocation goals, harvest goals, tier capacity goals, asset requirement goals, tier online/offline goals, and data gathering goals.

In one embodiment, BLT 206 presents a task interface to SLAI 204 for the creation and management of specific tasks in order to achieve the currently in force goals. In particular, rule engines 246 invoke the task interface based on evaluation of the defined rule sets in view of the expected state and actual state for the fabric. Example task interfaces include interfaces to: reserve node resources; query resources for a node slot; associate or disassociate an image with a node in a tier node slot; allocate, de-allocate, startup or shutdown a node; move a node to a tier; apply, remove or cycle power of a node; create a golden image; create or delete an image instance; and delete an activity, node or tier.

Report generator 302 provides an extensible mechanism for generating reports 314. Typical reports include image utilization reports that contain information with respect to the number of nodes running each software image, inventory reports detailing both the logical and physical aspects of the fabric, and system event reports showing all events that have occurred within the fabric. Report generator 302 gathers, localizes, formats and displays data into report form for presentation to the user. Report generator 302 may include one or more data gathering modules (not shown) that gather events in accordance with a schedule and update an events table to record the events. The data gathering modules may write the events in XML format.

Figure 20:
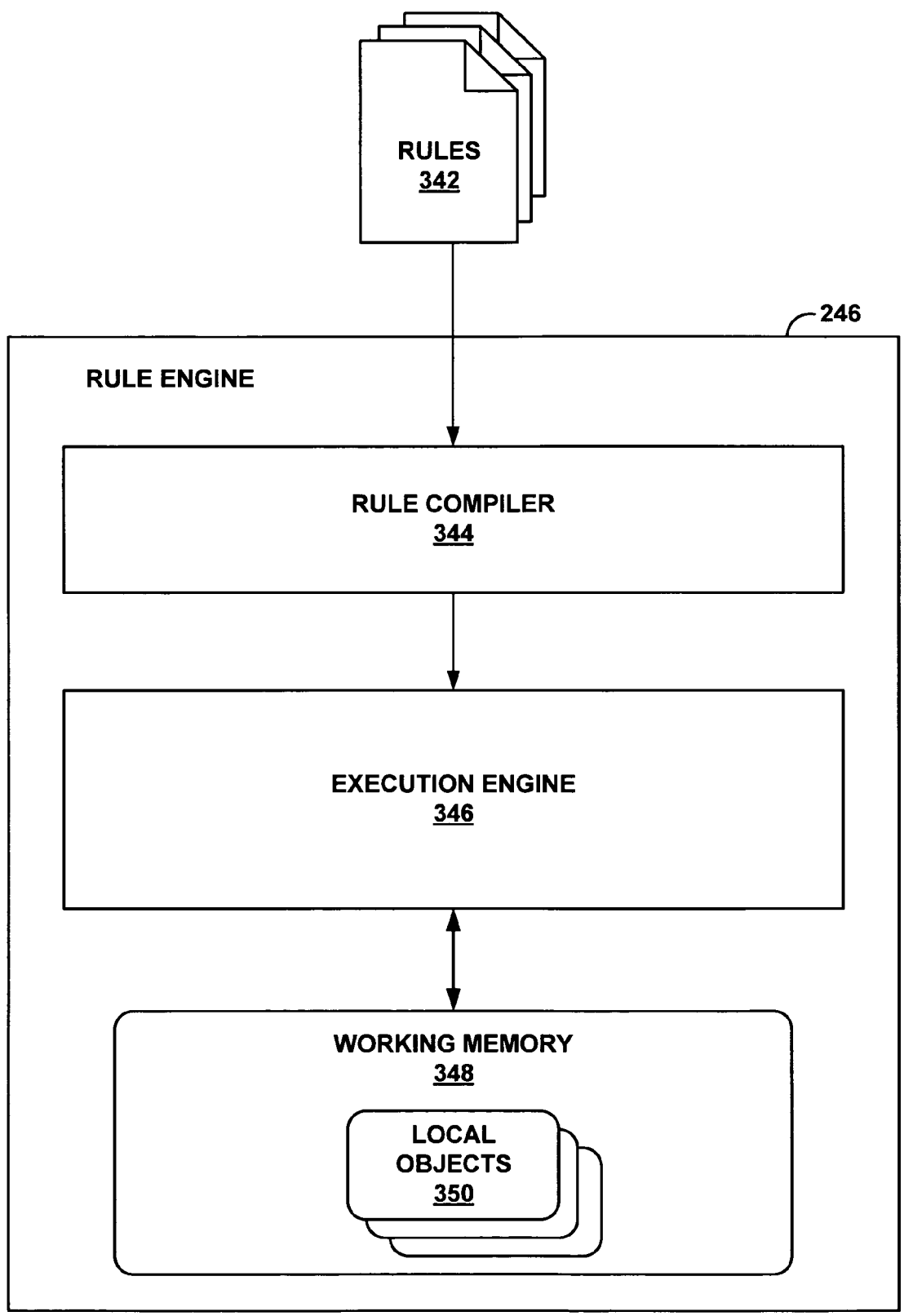
FIG. 20 is a block diagram illustrating one embodiment of a rule engine in further detail.

FIG. 20 is a block diagram illustrating one embodiment of a rule engine 246 (FIG. 17). In the illustrated embodiment, rule engine 246 includes a rule compiler 344 and an execution engine 346. Each of rules 342 represents a unit of code that conforms to a rule language and expresses a set of triggering conditions and a set of implied actions. When the conditions are met, the actions are eligible to occur. The following is one example of a configuration rule:

```
rule checkTierLoad {
    Tier t where status != "overloaded";
    LoadParameter p where app == t.app && maxload < t.load;
} -> {
    modify t {
        status: "overloaded";
    };
}
```

When translated, this example rule marks a tier as overloaded if an application is implemented by the tier and the maximum specified load for the application has been exceeded. Another example rule for outputting a notification that a tier is overloaded and automatically invoking a task within BLT 206 to add a node is:

```
rule tierOverloadNotify {
    Tier t where status == "overloaded";
} -> {
    notify "Tier: " + t + "is overloaded.";
    BLT.addNode(f);
}
```

Rule compiler 344 compiles each of rules 344 and translates match conditions of the rules into a discrimination network that avoids redundant tests during rule execution. Execution engine 346 handles rule administration, object insertion and retrieval, rule invocation and execution of rule actions. In general, execution engine 346 first matches a current set of rules 342 against a current state of working memory 348 and local objects 350. Execution engine 346 then collects all rules that match as well as the matched objects and selects a particular rule instantiation to fire. Next, execution engine 346 fires (executes) the instantiated rule and propagates any changes to working memory 348. Execution engine 346 repeats the process until no more matching rule instantiations can be found.

Firing of a rule typically produces a very small number of changes to working memory 348. This allows sophisticated rule engines to scale by retaining match state between cycles. Only the rules and rule instantiations affected by changes are updated, thereby avoiding the bulk of the matching process. One exemplary algorithm that may be used by execution engine 346 to handle the matching process includes the RETE algorithm that creates a decision tree that combines the patterns in all the rules and is intended to improve the speed of forward-chained rule system by limiting the effort required to re-compute a conflict set after a rule is fired. One example of a RETE algorithm is described in Forgy, C. L.: 1982, 'RETE: a fast algorithm for the many pattern/many object pattern match problem', Artificial Intelligence 19, 1737, hereby incorporated by reference. Other alternatives include the TREAT algorithms, and LEAPS algorithm, as described by Miranker, D. P.: 'TREAT: A New and Efficient Match Algorithm for AI Production Systems'. ISBN 0934613710 Daniel P. Miranker, David A. Brant, Bernie Lofaso, David Gadbois: On the Performance of Lazy Matching in Production Systems. AAAI 1990: 685692, each of which is hereby incorporated by reference.

Figure 21:
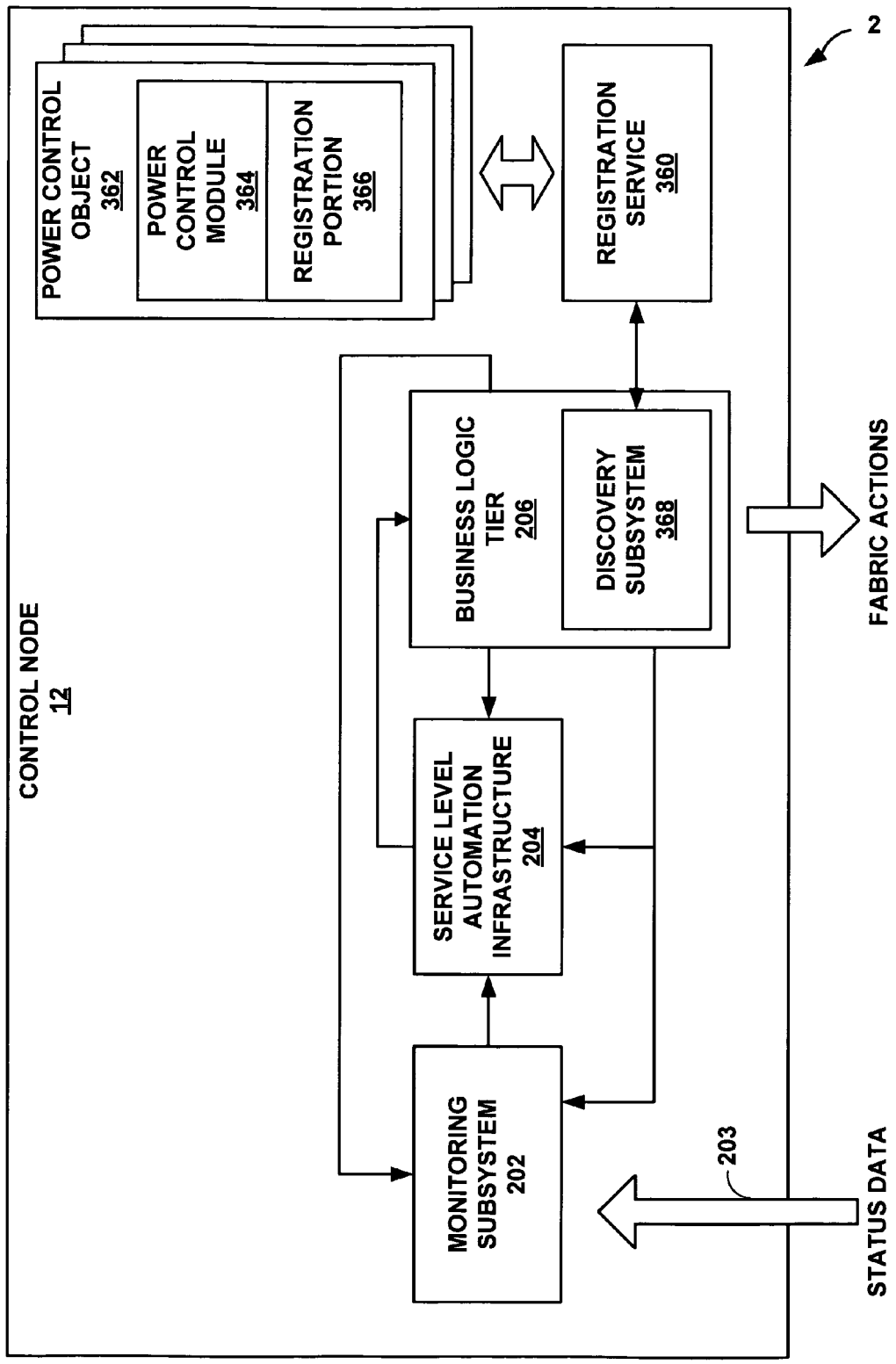
FIG. 21 is a block diagram illustrating an exemplary embodiment of a control node that uses an extensible power control system.

FIG. 21 is a block diagram illustrating an exemplary embodiment of a control node 12 that uses an extensible power control system. In this exemplary embodiment, distributed computing system 10 (FIG. 1) includes a plurality of hardware power controllers coupled to network 18 that apply power control applications to nodes. For instance, a hardware power controller may apply a power control application that shuts a node down. Control node 12 provides an operating environment for execution of a plurality of registered power control modules that instruct the hardware power controllers to perform power control applications on application nodes. In addition, control node 12 may provide autonomic control of the application nodes.

In the embodiment shown in FIG. 21, a power control object 362 contains a power control module 364 that that has been approved for use within distributed computing system 10. In other words, each power control module is usually compatible with a different vendor-specific management interface exhibited by a type of hardware power controller that may be deployed within system 10. For instance, a first power control module 364 may be compatible with a type of hardware power controllers manufactured by Vendor A. However, that hardware power controller may exhibit a management interface that is different from a management interface exhibited by a second hardware power controller. Because hardware power controllers manufactured by different vendors might not exhibit the same management interface, administrator 20 may need a power control module that is compatible with the management interface of the first hardware power controller and a second power control module that is compatible with the management interface of the second power controller in order to provide autonomic control over the power controllers. For instance, if distributed computing system 10 also includes a hardware power controller manufactured by Vendor B, administrator 20 may need to deploy a second power control module that corresponds with to the type of hardware power controllers manufactured by Vendor B.

In one embodiment, each power control module implements a generalized software object interface that is common to all power control module deployable within control node 12. The common software object interface may specify a set of abstract method headers. Each power control module implements each abstract method specified by the software object interface in a manner to comply with the vendor-specific requirements of the respective hardware power controller. For example, the software object interface may specify a method header for a method "powerOff" that is invoked to power down an application node associated with a hardware power controller. In this case, power control module 364 implements a method body for the "powerOff" method that contains possibly vendor-specific code needed to power down the node given the management interface of the hardware power controller that manages power for the application node.

If a hardware power controller does not support a method specified in the generalized software object interface, the respective power control module 364 implements a corresponding method body for the method that either performs no function or emulates the unsupported function. For example, suppose that the generalized software object interface defines a method "shutdown" that shuts down a node gracefully. Further suppose that a particular type of hardware power controller does not have the capacity to shut a node down gracefully. In this situation, a power control module corresponding with the type of hardware power controller implements a method body for the "shutdown" method that emulates to control node 12 the graceful shutdown, such as described in U.S. patent application Ser. No. 11/192,303, filed Jul. 28, 2005, entitled "UNIVERSAL POWER CONTROL SYSTEM FOR AN AUTONOMICALLY CONTROLLED DISTRIBUTED COMPUTING SYSTEM," the entire contents of which is incorporated herein by reference.

Because every registered power control module implements the same or substantially the same software interface, BLT 206 may interact with every registered power control module in the same way without regard to vendor-specific details. In other words, BLT 206 may not need to know what type of hardware power controller with which the BLT is interacting. For this reason, BLT 206 may not need different executable code to interact with different types of hardware power controllers. Hence, BLT 206 may not need to be recompiled whenever administrator 20 needs BLT 206 to interact with a new type of hardware power controller.

In some embodiments, power control module 364 is a Java Management Extension Management Beans (JMX MBeans)

that implement a common Java interface. Like other MBeans, power control modules 364 may conform to standard MBean naming conventions. That is, power control modules 364 may have a class name and method names that conform to the standard naming convention. Conforming to these naming conventions allows other software components, such as BLT 206, to identify MBeans and interact with MBeans in a uniform fashion.

Control node 12 automatically registers a new power control module 364 without requiring interrupting execution of the control node, i.e., compilation or restart of the control node. For example, a registration service 360 of control node 12 detects the deployment of power control module 364. Registration service 360 then adds an identifier of power control module 364 to a list of power control modules already registered with registration service 360 of control node 12. Adding an identified of power control module 364 involves executing an automatic registration portion 366 of power control module 364 to determine the identifier of power control module 364 when power control module 364 is placed in a deployment directory of the control node. As shown in FIG. 21, a power control object 362 contains both the power control module 364 and registration portion 366. Registration portion 366 is a small executable program that controls automatic installation of power control module 364 within a software framework provided by control node 12. In the context of JMX MBeans, registration portion 366 may be a "servlet." In one embodiment, when administrator 20 places a power control object into a deployment directory of control node 12, control node 12 automatically executes registration portion 366. When registration portion 366 executes, registration portion 366 sends an identifier of the new power control module 364 to registration service 360. Upon receiving the identifier of the power control module from the registration portion associated with the power control module, registration service 360 adds the identifier of power control module 364 to a list of registered power control modules.

When administrator 20 removes, power control object 362 from the deployment directory of control node 12, registration portion 366 again executes automatically. This time, when registration portion 366 executes, registration portion 366 sends a de-registration request. When registration service 360 receives the de-registration request from registration portion 366, registration service 360 removes the identifier of power control module 364 from the list of identifiers of registered power control modules.

Registration service 360 may implement an MBean server that allows other software components to easily invoke methods of power control module MBeans registered with the MBean server. Specifically, an MBean server provides methods that return the identifiers of MBeans that match criteria provided by the other software components. The identifiers returned by registration service 360 conform to the MBean naming convention. Using these identifiers, the other software components may invoke methods supplied by the power control module MBeans.

A discovery subsystem 368 of BLT 206 uses the list of registered power control modules to associate the new power control module with a hardware power controller. For example, discovery subsystem 368 may automatically determine whether power control module 364 is compatible with a type of hardware power controller without requiring substantial manual intervention. When a node in distributing computing system 10 comes online, the power controller sends a DHCP request to control node 12. Upon receiving the DHCP request, discovery subsystem 368 extracts certain characteristics of the request used to identify the type of power controller the node has. Discovery subsystem 368 then scans through the list of identifiers of registered power control modules to determine whether a registered power control module is compatible with the type of hardware power controller on the newly identified node. The association of power controller module to the application node is made before the application node is entered into the free pool of application nodes.

If discovery subsystem 368 determines that power control module 364 corresponds to the type of the hardware power controller, discovery subsystem 368 validates the firmware of the hardware power controller. Vendors of hardware power controllers frequently update firmware that operates the hardware power controllers. These updates may create incompatibilities between a type of hardware power controller and a power control module corresponding to the type of hardware power controller. For example, a vendor may change the firmware of a type of hardware power controllers so that the hardware power controllers use the Secure Shell Protocol (SSH) instead of the Telnet protocol. If power control module 364 for this type of hardware power controller still uses the Telnet protocol, power control module 364 is incompatible with the type of hardware power controller.

If discovery subsystem 368 determines that power control module 364 corresponds to a type of the hardware power controller on a node and power control module 364 is compatible with the firmware on the hardware power controller, discovery subsystem 368 associates registered power control module 364 with the hardware power controller and the compute node. Specifically, discovery subsystem 368 updates a database to store a mapping from the compute node's hardware power controller to the identifier of power control module 364.

Control node 12 may then use power control module 364 to autonomically cause a hardware power controller to perform a power control application. When BLT 206 needs to interact with a hardware power controller, the BLT retrieves an identifier of the power control module. For instance, BLT 206 may use a mapping in the database to retrieve the identifier of power control module 364 that is compatible with the hardware power controller. BLT 206 may then send instructions to the power control module to perform a power control application. For example, the power control application may be to power on, power down, reset, shutdown, retrieve power status, and so on. Specifically, BLT 206 invokes methods of the power control module by referencing the identifier of the power control module.

A distributed computing system that employs an extensible power control system may enjoy several advantages. For example, the extensible power control system simplifies administration of distributed computing system 10. In particular, administrator 20 may initiate execution of control node 12 to autonomically control distributed computing system 10. Administrator 20 may deploy power control module 364 after initiating execution of control node 12. After deploying power control module 364, i.e., adding a power control object into a deployment directory, control node 12 subsequently uses power control module 364 to cause a hardware power controller to perform a power control application. In this way, the extensible power control system allows administrator 20 to add a new type of hardware power controller without having to recompile any software. This means that the administrator may more easily configure distributed computing environment 10. In addition, not recompiling the software means that administrator 20 does not need to interrupt the execution of any software in order to manage new types of hardware power controllers. Further, the system allows the administrator to deploy only such software as is needed to manage the types of hardware power controllers in distributed computing environment 10. That is, the software that autonomically manages the hardware power controllers does not need to include software that corresponds to hardware power controllers that are not actually present in distributed computing environment 10. This reduces the size and complexity of the software.

The extensible power control system may also present advantages to developers of software that manages the autonomically controlled distributed computing system. Because all power control modules share a common software object interface, the structure of each power control module is substantially similar. For this reason, developers may find it easier to design and maintain power control modules. In addition, software that uses the power control modules is simpler because the software may regard all types of hardware power controllers as the same.

Figure 22:
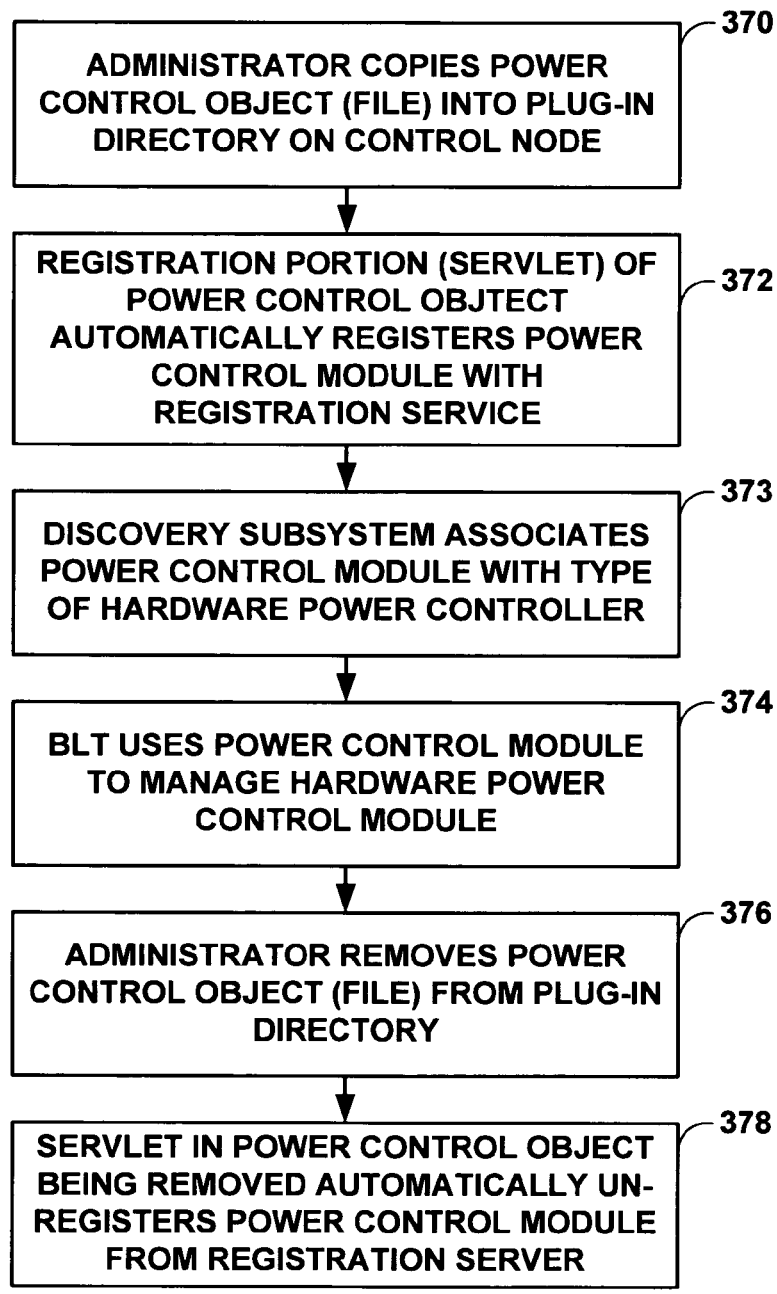
FIG. 22 is a flowchart illustrating an exemplary mode of operation for deploying and un-deploying a power control module.

FIG. 22 is a flowchart illustrating an exemplary mode of operation for deploying and un-deploying a power control module. Initially, administrator 20 copies power control object 362 into a designated deployment directory (370). When power control object 362 is copied into the deployment directory, registration portion 366 of power control object 362 automatically registers power control module 364 in power control object 362 with registration service 360 (372).

After registration service 360 registers power control module 364, discovery subsystem 368 of BLT 206 may establish an association between power control module 364 and a type of hardware power controller (373). Subsequently, BLT 206 may use power control module 364 to manage a type of hardware power controller (374).

Later, administrator 20 may determine that power control module 364 is no longer useful in distributed computing system 10. Administrator 20 may therefore remove power control object 362 from the deployment directory (376). When administrator 20 removes power control object 362 from the deployment directory, registration portion 366 of power control object 362 automatically un-registers power control module 364 from registration service 360 (378).

Figure 23:
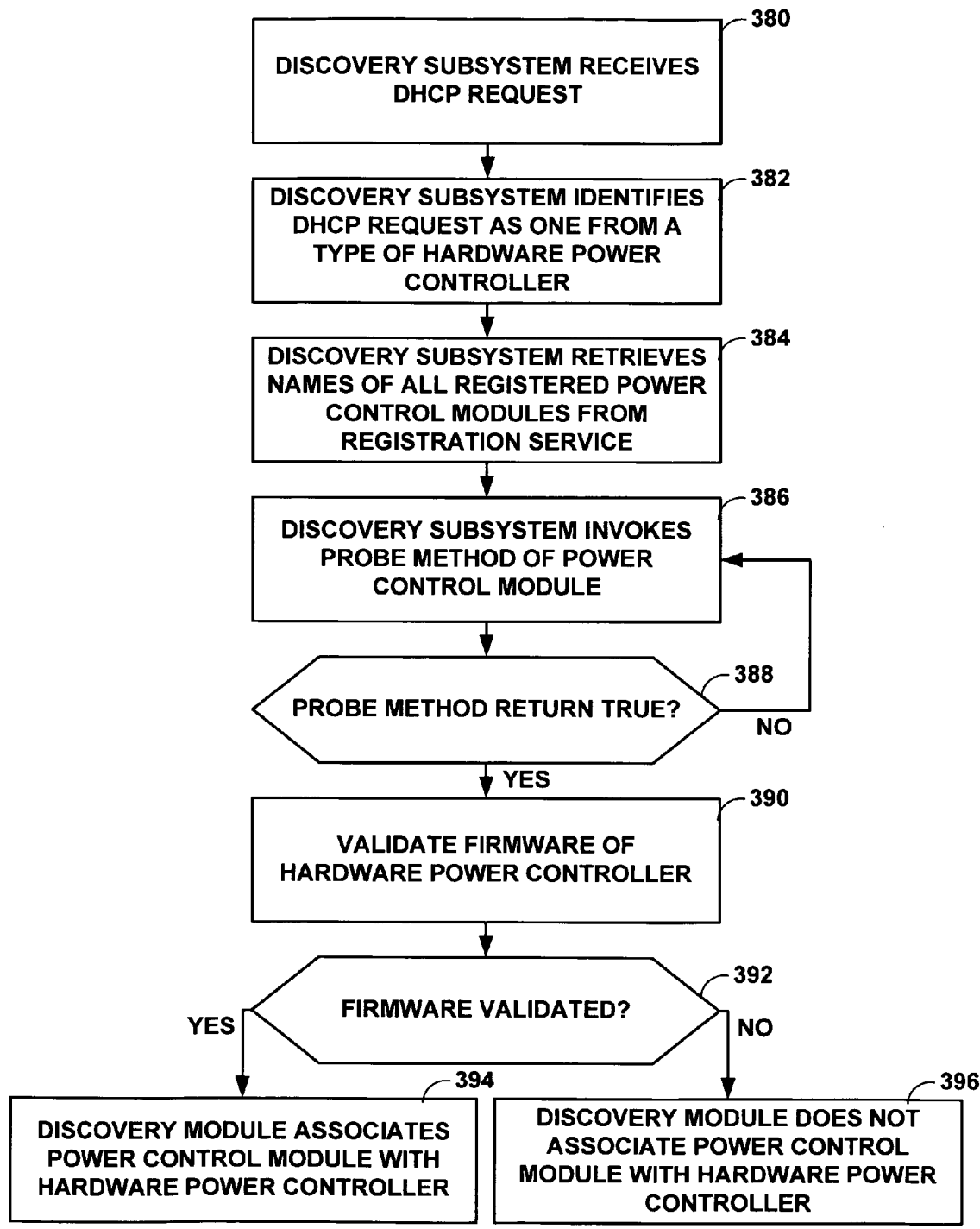
FIG. 23 is a flowchart illustrating an exemplary mode of operation of a discovery subsystem within a control node.

FIG. 23 is a flowchart illustrating an exemplary mode of operation of a discovery subsystem 368 within control node 12. Initially, discovery subsystem 368 receives a DHCP request from within distributed computing system 10 (380). Upon receiving the DHCP request, discovery subsystem 368 extracts information as to the source of the request. Discovery subsystem 368 may identify the node as a type of hardware power controller (382)

When discovery subsystem 368 identifies the node as a type of hardware power controller, discovery subsystem 368 attempts to associate a power control module to the hardware power controller. Specifically, discovery subsystem 368 retrieves a list of all registered power control modules from registration service 360 (384). Next, discovery subsystem 368 invokes a "probe" method implemented in each power control module (386). In general, the "probe" method returns true when a power control module corresponds with a type of hardware power controller. If the "probe" method does not return true for a given power control module (NO of 388), discovery subsystem 368 invokes the "probe" method on the next power control module (386). This continues until a "probe" method returns true or discovery subsystem 368 has invoked the "probe" method of each registered power control module.

On the other hand, if the "probe" method of a power control module returns true (YES of 388), discovery subsystem 368 validates the firmware of the hardware power controller (390). Validating the firmware assures discovery subsystem 368 that the power control module is compatible with the version of firmware installed on the hardware power controller. If discovery subsystem 368 validates the firmware of the hardware power controller (YES of 392), discovery subsystem 368 associates the power control module with the hardware power controller (394). Otherwise, if discovery subsystem 368 does not validate the firmware of the hardware power controller (NO of 392), discovery subsystem 368 does not associate the power control module with the hardware power controller (396).

Figure 24:
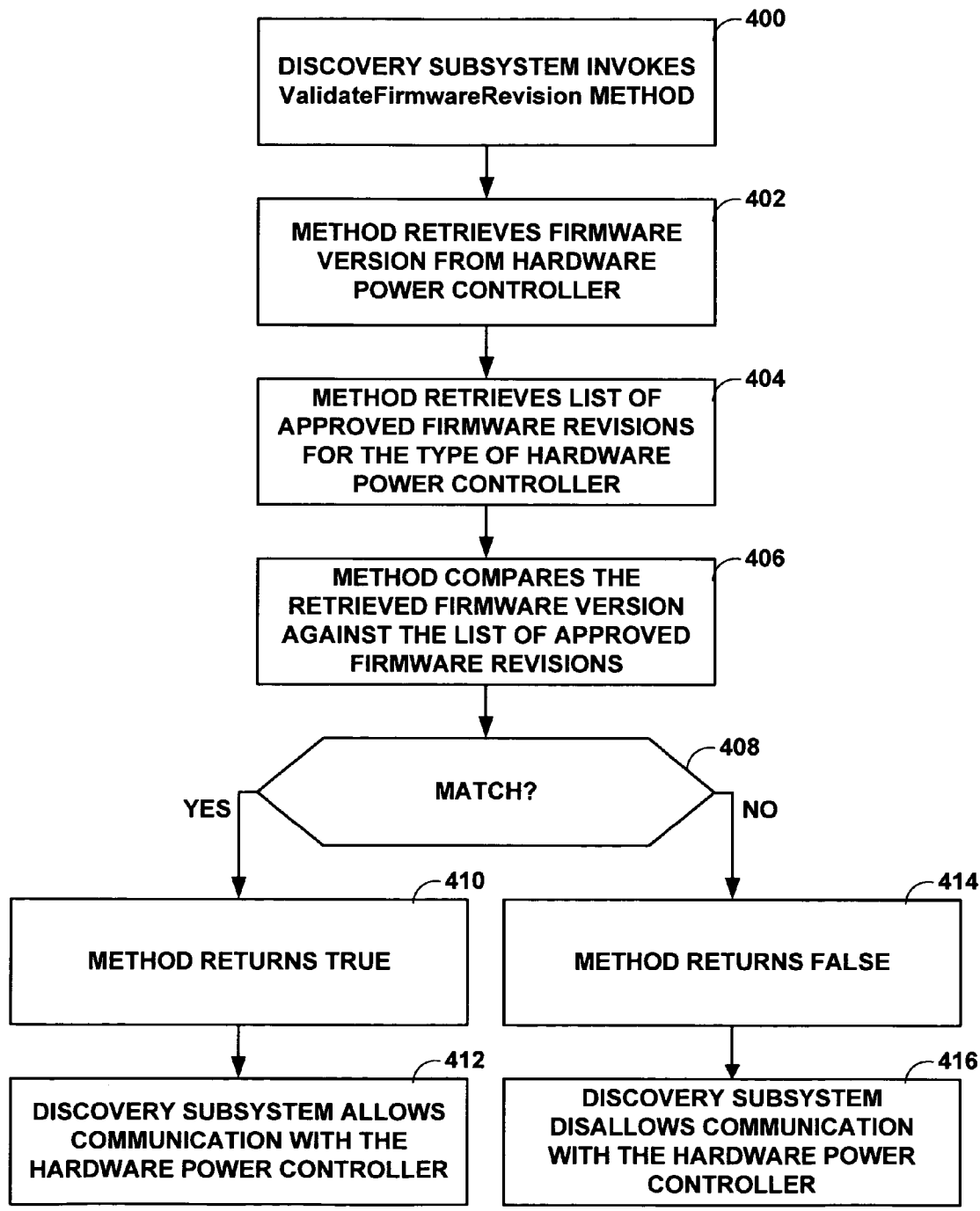
FIG. 24 is a flowchart illustrating an exemplary mode of operation of a firmware revision validation method.

FIG. 24 is a flowchart illustrating an exemplary mode of operation of a firmware validation method. To begin a firmware validation of a hardware power controller in light of power control module 364, discovery subsystem 368 may invoke a "ValidateFirmwareRevision" method of power control module 364 (400). Following invocation, the method retrieves a firmware version code from the hardware power controller (402). Next, the method retrieves a list of approved firmware revisions for the type of hardware power controller (404).

After retrieving both the firmware version code and the list of approved firmware revisions, the method compares the retrieved firmware version against the list of approved firmware revisions (406). If there is a match in the two lists (YES of 408), the method returns true (410). Consequently, discovery subsystem 368 allows communication with the hardware power controller using power control module 364 (412). Conversely, if no match exists between the firmware version code and the list of approved firmware revisions (NO of 408), the method return false (414). As a result, discovery subsystem 368 does not allow communication with the hardware power controller using power control module 364 (416).

Various embodiments of the invention have been described. For example, power control modules have been described in the context of Java Management Extensions Management Beans. Nevertheless, various modifications may be made without departing form the spirit and scope of the invention. For instance, the power control modules may conform to another data structure. These and other embodiments are within the scope of the following claims.

The invention claimed is:

1. A system comprising:
    a control node comprising one or more programmable processors, wherein the control node is operable to provide an operating environment for a plurality of power control modules, executing on the one or more processors, that instruct a plurality of hardware power controllers to facilitate remote power control on a respective plurality of application nodes, and wherein the control node automatically registers a new power control module without requiring interrupting execution of the control node; and
    wherein the control node is operable to invoke the new power control module, and to validate that a firmware version of at least one of the plurality of hardware power controllers is compatible with the new power control module.

2. The system of claim 1, wherein the control node provides autonomic control of the application nodes.

3. The system of claim 1, wherein a first hardware power controller in the plurality of hardware power controllers exhibits a management interface that is different from a management interface exhibited by a second hardware power controller in the plurality of hardware power controllers.

4. The system of claim 3, wherein a first power control module is compatible with the management interface of the first hardware power controller and a second power control module is compatible with the management interface of the second hardware power controller.

5. The system of claim 1, wherein the control node comprises:
a registration service that maintains a list of the registered power control modules; and
a discovery subsystem that uses the list to associate the new power control module with one of the plurality of hardware power controllers.

6. The system of claim 5, wherein the registration service comprises a Java Management Extensions Management Bean server.

7. The system of claim 5, wherein the new power control module includes an automatic registration portion that automatically registers the new power control module with the registration service when the new power control module is placed in a deployment directory of the control node.

8. The system of claim 7, wherein the registration portion automatically de-registers the new power control module with the registration service when the power control module is removed from the deployment directory.

9. The system of claim 7, wherein the new power control module and the registration portion are packaged into a single object.

10. The system of claim 5, wherein the discovery subsystem associates a newly discovered application node with one of the hardware power controllers prior to entering the application node into a free pool of the application nodes.

11. The system of claim 1, wherein each of the plurality of power control modules share a software object interface common to each of the power control modules.

12. The system of claim 11, wherein the power control modules implement each method specified by the software object interface.

13. The system of claim 11, wherein the software interface comprises a Java object interface.

14. The system of claim 13, wherein the power control modules comprise Java Management Extensions Management Beans.

15. The system of claim 1, wherein each of the power control modules includes an identifier that uniquely identifies the power control modules.

16. The system of claim 15,
wherein the control node uses the identifiers of the power control modules to invoke methods implemented by the power control modules, and
wherein the control node receives the identifiers of the power control modules from registration portions of the respective power control modules.

17. The system of claim 1, wherein the remote power control comprises powering on one or more of the application nodes controlled by the hardware power controllers.

18. The system of claim 1, wherein the remote power control comprises powering off one or more of the application nodes controlled by the hardware power controllers.

19. A computer-executing method comprising:
automatically registering a new power control module with a control node of an autonomic distributed computing system without interrupting execution of the control node;
using, with the control node, the power control module to autonomically cause a hardware power controller of the distributed computing system to perform a power control application on an application node within the distributed computing system, wherein the hardware power controller facilitates remote power control of the application node;
validating that a firmware version of the hardware power controller is compatible with the new power control module; and
invoking the new power control module.

20. The method of claim 19, further comprising:
autonomically controlling the application node with the control node,
applying the power control application to the application node.

21. The method of claim 19, wherein the hardware power controller exhibits a management interface that is different than a management interface exhibited by a second hardware power controller in the plurality of hardware power controllers.

22. The method of claim 21, wherein the new power control module is compatible with the management interface of the hardware power controller and a second power control module is compatible with the management interface of the second hardware power controller.

23. The method of claim 19, wherein registering the new power control module comprises:
detecting the deployment of the new power control module;
adding an identifier of the new power control module to a list of power control modules already registered with the control node; and
using the list of registered power control modules to associate the new power control module with the hardware power controller.

24. The method of claim 23, wherein using the list of deployed power control module comprises:
automatically determining whether the new power control module is compatible with a type of the hardware power controller without manual intervention;
identifying the firmware of the hardware power controller; and
updating a database to store a mapping from the hardware power controller to the identifier of the power control module.

25. The method of claim 23 wherein adding the power control module to the list comprises executing an automatic registration portion of the new power control module to determine the identifier of the power control module when the new power control module is placed in a deployment directory of the control node.

26. The method of claim 25, wherein a power control object contains the registration portion and the power control module.

27. The method of claim 19, further comprising automatically un-registering the new power control module without interrupting the execution of the control node in response to an indication from a user that the new power control module is to be un-registered.

28. The method of claim 27, wherein un-registering the power control module comprises:
removing the identifier of the power control module from a list of registered power control modules; and
using the list of registered power control modules to associate the power control module with the hardware power controller.

29. The method of claim 28, wherein removing the power control module from the list comprises receiving a de-registration request from a registration portion associated with the power control module when the power control module is removed from a deployment directory.

30. The method of claim 19, wherein autonomically causing a hardware power controller to perform a power control application comprises:
retrieving an identifier of the power control module; and
invoking methods of the power control module by referencing the identifier of the power control module.

31. The method of claim 30, wherein the power control module implements a generic software object interface that is common to every power control module used with the control node.

32. The method of claim 31, wherein the power control module implements each method specified by the software object interface.

33. The method of claim 31, wherein the power control module is a Java Management Extensions Management Bean.

34. A non-transitory computer-readable storage medium comprising instructions that cause a control node of an autonomic distributed computing system to:

execute a registration portion of a new power control module to register the new power control module with the control node without interrupting execution of the control node;
invoke, with the control node, the new power control module to autonomically cause a hardware power controller of the distributed computing system to perform a power control application on one or more application nodes, wherein the hardware power controller facilitates remote power control of the one or more application nodes;
validating that a firmware version of the hardware power controller is compatible with the new power control module; and
invoke the new power control module to determine whether the new power control module is compatible with the hardware power controller.

35. The distributed computing system of claim 4, wherein the first power control module and the second power control module each implement a common software interface.

* * * * *